(12) United States Patent
Silberman et al.

(10) Patent No.: US 7,321,812 B2
(45) Date of Patent: Jan. 22, 2008

(54) METHOD OF TERRAIN FOLLOWING

(75) Inventors: Gadi Silberman, Shimishit (IL); Nitsan Sharav-Schapiro, Kefar Veradim (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 18 days.

(21) Appl. No.: 11/035,728

(22) Filed: Jan. 18, 2005

(65) Prior Publication Data
US 2005/0270224 A1    Dec. 8, 2005

(30) Foreign Application Priority Data
Jan. 15, 2004    (IL) ..................................... 159893

(51) Int. Cl.
*G05D 1/00* (2006.01)
*G05D 1/06* (2006.01)

(52) U.S. Cl. .............................. 701/3; 701/200; 342/65

(58) Field of Classification Search ..................... None
See application file for complete search history.

(56) References Cited

U.S. PATENT DOCUMENTS 5,706,011 A * 1/1998 Huss et al. ................. 342/65
6,005,581 A * 12/1999 Gjullin ....................... 345/582
6,421,603 B1 * 7/2002 Pratt et al. .................. 701/206

2003/0206120 A1 * 11/2003 Ishihara et al. ............. 340/970
2006/0031004 A1 * 2/2006 Lundberg .................... 701/200

FOREIGN PATENT DOCUMENTS

EP    1496461 A1 *   1/2005

OTHER PUBLICATIONS

Asseo, S.J.; Terrain following/terrain avoidance path optimization using the method of steepest descent; Aerospace and Electronics Conf, 1988; IEEE—vol. 3, pp. 1128-1136; May 1988.*
Oxley, P.C.; Terrain following and terrain avoidance algorithms; Navigation, Guidance and Control on Aerospace; IEE; Nov. 1989; pp. 2/1-2/3.*
Fountain, J.R.; Digital terrain systems; Airborne Navigation Systems Workshop (Digest No. 1997/169); Feb. 1997; pp. 4/1-4/6.*
Passive Terrain Following Using Stored Map and Global Positioning System, Woodward et al, 1981 IEEE 0547-3578/81/0000-0779 pp. 779-785.
Optimal Aircraft Terrain-Following Analysis And Trajectory Generation, Lu et al, Iowa State Univ, Ames, Iowa 50011-3231 Journal of Guidance , Control and Dynamics vol. 18, No. 3, May-Jun. 1995.
Optimal—Path Precision Terrain—Following System, Funk US Air force Wright Patterson Air Force Base, Ohio pp. 128-134.

(Continued)

*Primary Examiner*—Michael J. Zanelli
(74) *Attorney, Agent, or Firm*—Mark M. Friedman

(57) ABSTRACT

A method of designing a terrain-following flight profile for an air vehicle. The method includes providing a terrain profile, and transforming the terrain profile into the terrain-following flight profile according to one or more performance parameter of the air vehicle.

59 Claims, 22 Drawing Sheets

OTHER PUBLICATIONS

Terrain Following Terrain Avoidance for Advanced Penetrating Aircraft; Dr Gregory Dunn et al; Boeing Military Airplane Company, Seattle Washington 1982 IEEE, 0547-3578/82/0000-0560 pp. 560-567.

Optimal Trajectory Synthesis for Terrain- Following Flight, Menon et al; J Guidance vol. 14, No. 4 Jul.-Aug. 1991 pp. 807-813.
Approximate Altitude Transitions for High Speed Aircraft, Ardema et al ; J Guidance vol. 18, No. 3 May-Jun. 1995 pp. 559-560.

* cited by examiner

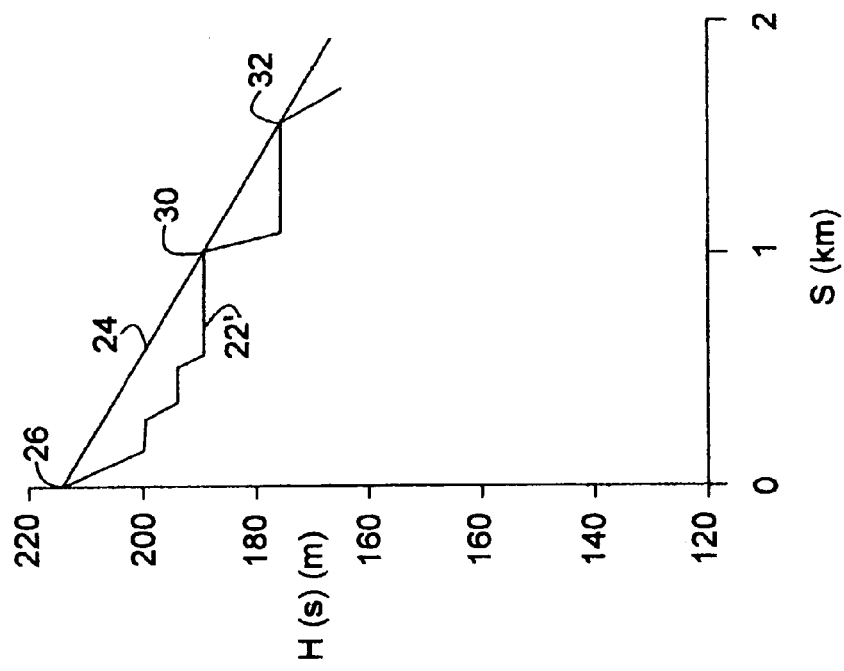
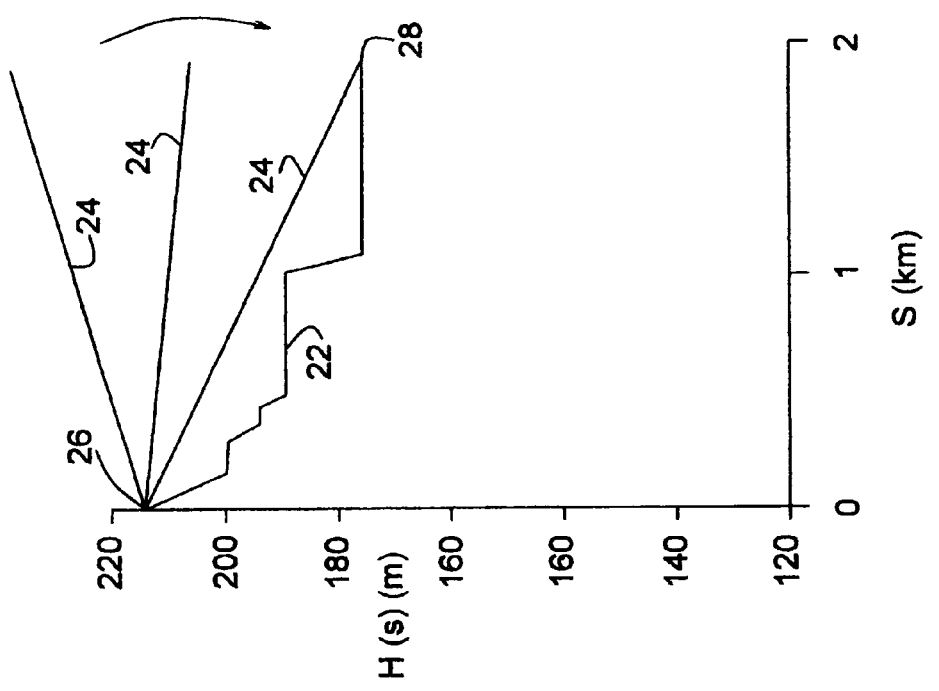

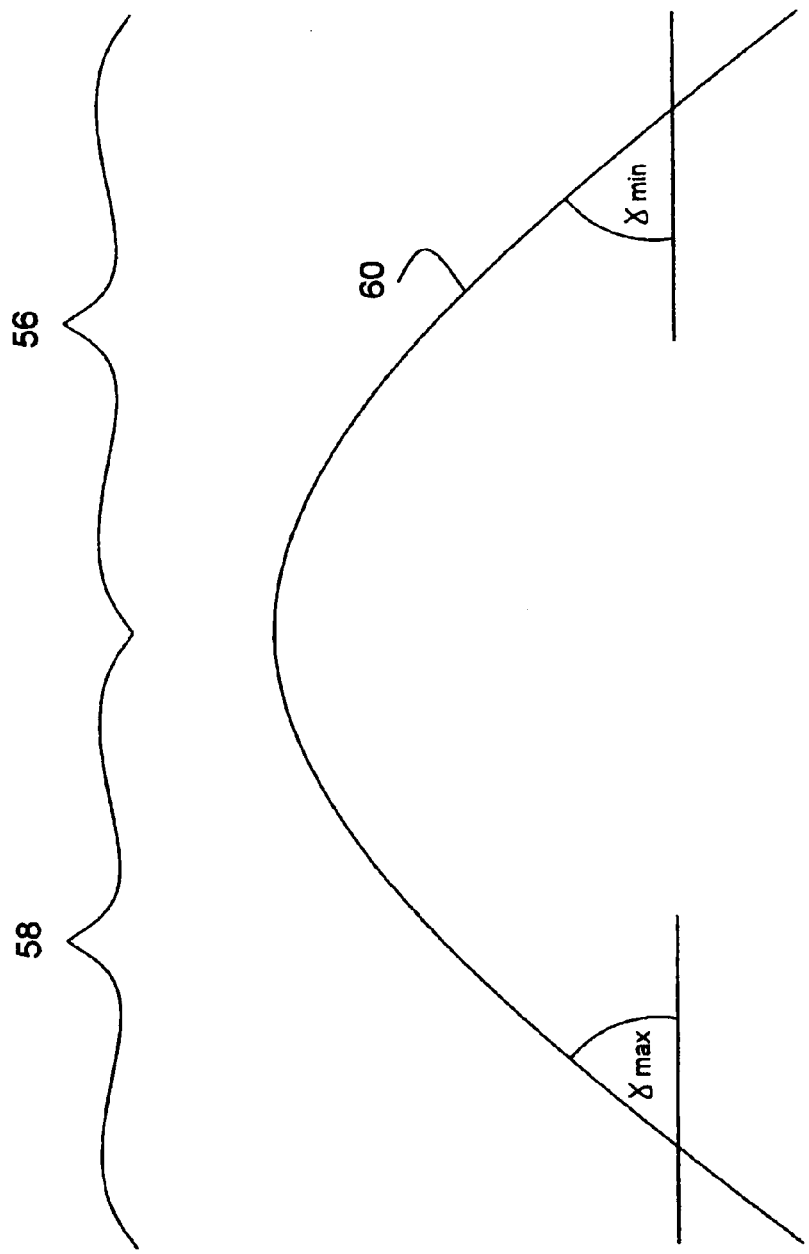

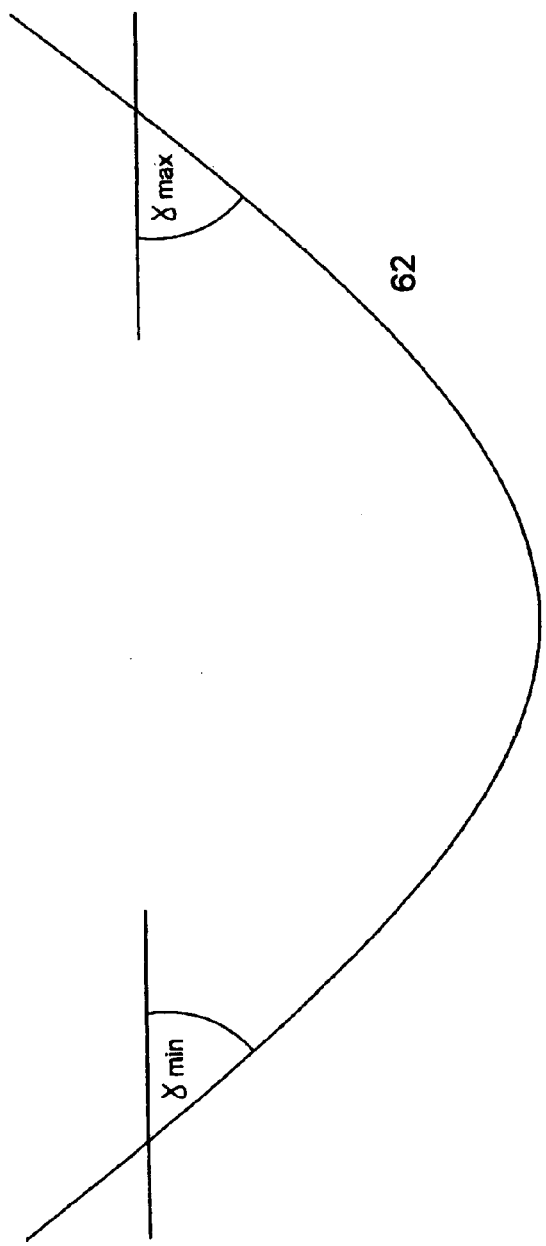

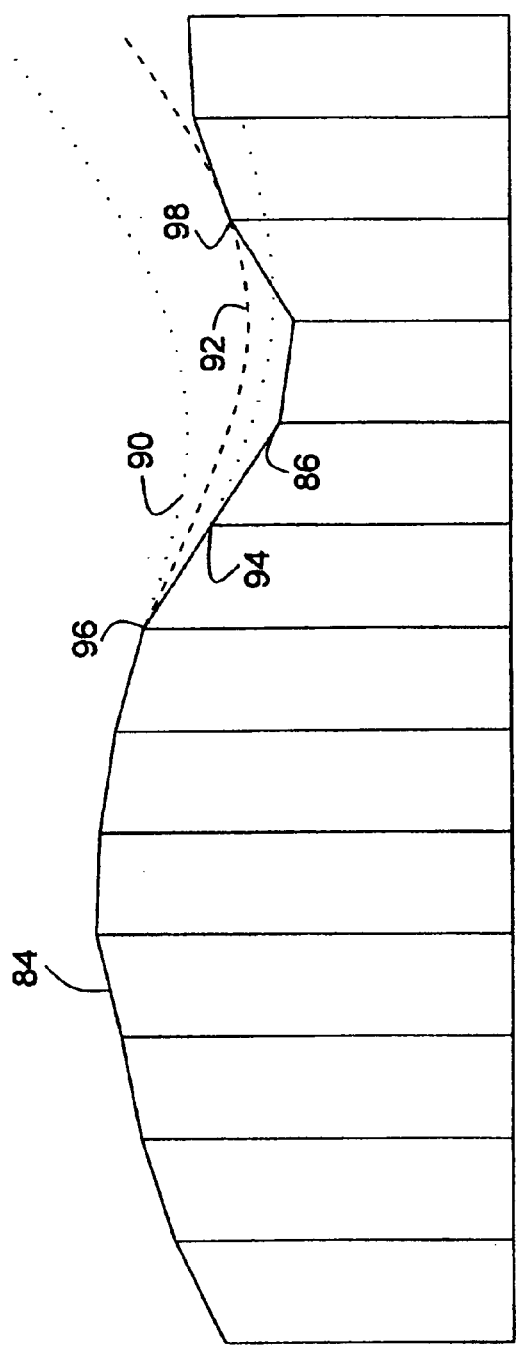

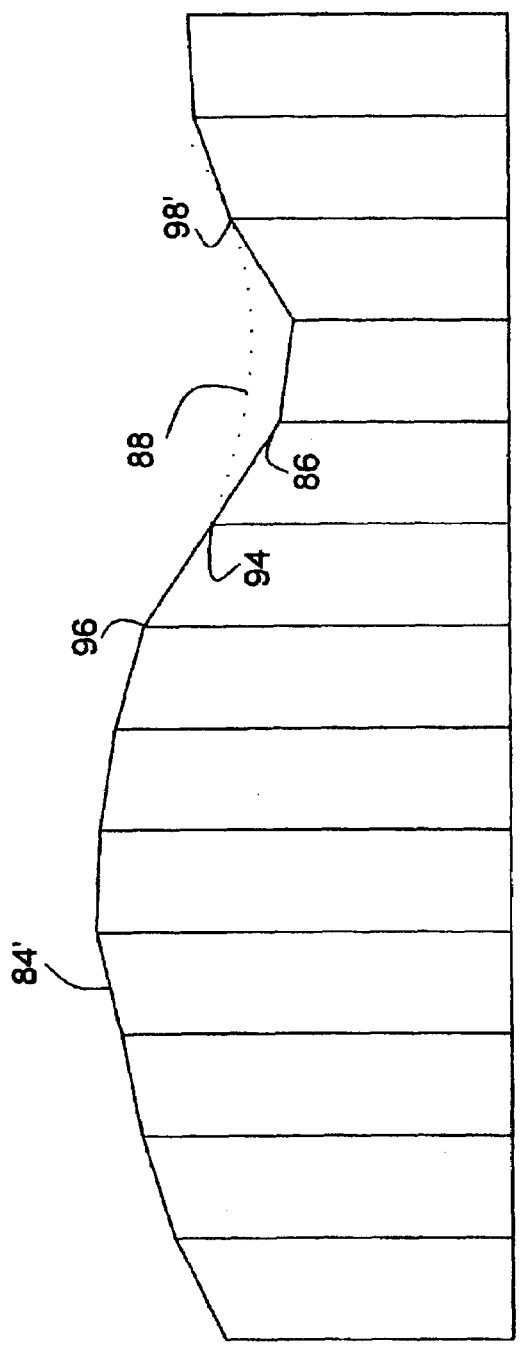

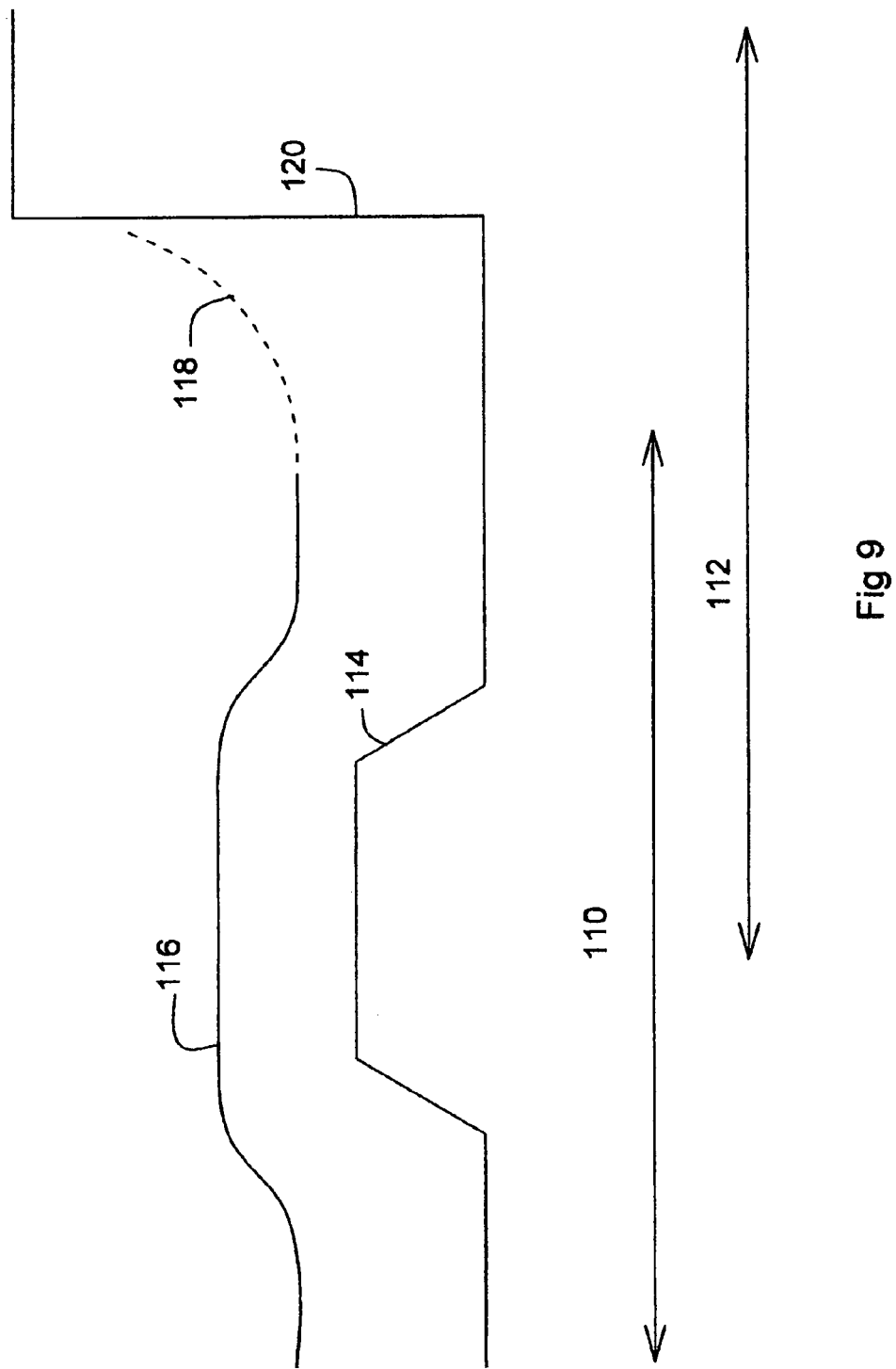

METHOD OF TERRAIN FOLLOWING

FIELD AND BACKGROUND OF THE INVENTION

The present invention relates to terrain following and, more particularly, to real-time methods for designing a terrain-following flight profile.

A combat air vehicle, for example a bomber, must fly close to the ground in order to reach its target without being detected and intercepted by the enemy. The general problem of flying as close as possible to the ground along a given flight path is known as the "terrain-following" problem. Early terrain following systems used active on-board sensors to determine the aircraft's position and terrain clearance. Radiation emitted by such active sensors could be detected by the enemy. As early as 1981, Alson C. Woodward and Wayne M. Hoover ("Passive terrain following using stored map and global positioning system", IEEE NAECON 0547-3578/81/0000-0079) recognized that an aircraft with an on-board GPS receiver could follow a pre-stored reference terrain profile while using the GPS receiver to measure its own position. The aircraft actually follows a pre-stored reference flight profile that corresponds to the terrain profile. The design of the flight profile is an optimization problem: within the constraints of the aircraft's performance limitations, how close can the aircraft fly to the ground while following the flight path? See, for example, Ping Lu and Bion L. Pierson, "Optimal aircraft terrain-following analysis and trajectory generation", *Journal of Guidance, Control and Dynamics* vol. 18 no. 3, May-June 1995. Usually, this optimization problem is solved iteratively.

One problem with the use of a pre-stored reference flight profile is that the actual flight profile followed by the aircraft usually deviates from the reference flight profile because of navigational uncertainties. These navigational uncertainties could be accounted for by computing the reference flight profile with respect to an "inflated" reference terrain profile, as described below; but at the cost of obtaining a suboptimal flight profile. The flight profile would be suboptimal because inflation in advance of the reference terrain profile necessarily would have to be based on "worst case" navigational uncertainties. There is thus a widely recognized need for, and it would be highly advantageous to have, a method for real time computation of a reference flight profile that would account for actual navigational uncertainties and so be less suboptimal than a reference flight profile computed in advance.

DEFINITIONS

The present invention relates to terrain-following guidance of an air vehicle. The term air vehicle is understood herein to include any vehicle capable of flight, including in particular manned aircraft and unmanned aerial vehicles (UAVs).

The trajectory followed by an air vehicle is a line in three-dimensional (x, y, z) space. The flight path of the air vehicle is a projection of the trajectory onto a horizontal (x, y) plane. The flight profile of the air vehicle is the vertical (z) coordinate of the trajectory as a function of distance s along the flight path.

The problem of optimal design of the trajectory as a whole is the terrain avoidance problem. This problem is more general than and beyond the scope of the present invention, although the present invention could be used as a component of the solution of the terrain avoidance problem. As discussed above, the problem addressed by the present invention is the terrain following problem: given an a priori flight path, what is the optimal flight profile?

A terrain profile is an estimate of the ground elevation as a function of s along the flight path. The flight profile is designed with reference to the corresponding terrain profile. Typically, the terrain profile is inflated to provide a safety margin. The present invention is directed towards methods of transforming a terrain profile into a flight profile. That the flight profile is a terrain-following flight profile means that the flight profile is designed to parallel the terrain as closely as possible within the relevant constraints.

The terrain profile that is transformed to the desired flight profile is defined with reference to a given flight path. More generally, to allow a manned air vehicle freedom of horizontal maneuver around the given flight path, the terrain profile is defined, with reference to a flight corridor of a given finite horizontal width about the flight path, as an estimate, as a function of s, of the maximum ground elevation along and to the sides of the flight path. The process of inflating the terrain profile takes into account the uncertainty in the lateral displacement of the air vehicle from the nominal flight path. Note that a flight path can be viewed as a special case of a flight corridor, to wit, a flight corridor of infinitesimal width.

Given a function f(s), an envelope of the function is a function g(s) that is equal to f(s) at selected points s and otherwise is greater than f(s). In the discussion below, the filtered terrain profile is an envelope of the inflated terrain profile and the flight profile is constructed by constructing successive envelopes of the filtered terrain profile.

Comparisons of quantities herein are algebraic comparisons. That a negative slope $\tan \gamma$ is at most about as small as a minimum slope $\tan \gamma_{min}$ means that $\tan \gamma$ is substantially bounded from below by $\tan \gamma_{min}$. Similarly, that a negative vertical acceleration $a_Z$ is at most about as small as a minimum negative vertical acceleration $a_{Zmin}$ means that $a_Z$ is substantially bounded from below by $a_{Zmin}$.

The terms "elevation" and "altitude" are used interchangeably herein.

SUMMARY OF THE INVENTION

The present invention provides a direct, non-iterative method of terrain-following flight profile design that is fast enough to be implemented in real time and so to be based on actual navigational uncertainties and on instantaneous values of air vehicle performance parameters rather than on worst case navigational uncertainties and on worst case values of air vehicle performance parameters. Because the present invention operates in real time, the present invention can take into account the changes in the performance characteristics of the air vehicle as the air vehicle flies along the trajectory whose altitude is defined by the flight profile.

The computations of the present invention do not require the fitting of a functional approximation to a discrete digital terrain map.

The present invention allows a tradeoff, in flight profile design, between the closeness with which the air vehicle follows the terrain and the gentleness of the maneuvers executed by the air vehicle.

According to the present invention there is provided a method of designing a terrain-following flight profile for an air vehicle, including the steps of: (a) providing a terrain profile; and (b) transforming the terrain profile into the terrain-following flight profile in accordance with at least one performance parameter of the air vehicle.

According to the present invention there is provided a method of designing a terrain-following flight profile for an air vehicle, including the steps of: (a) defining a terrain profile with reference to a flight corridor; (b) inflating the terrain profile, thereby providing an inflated terrain profile; (c) filtering the inflated terrain profile, thereby providing a filtered terrain profile; (d) constructing a first envelope for the filtered terrain profile, the first envelope being constrained so that every positive slope of the first envelope is at most about as great as a maximum climb slope of the air vehicle and every negative slope of the first envelope is at most about as small as a minimum dive slope of the air vehicle; (e) constructing a second envelope for the first envelope, the second envelope being constrained so that if the air vehicle flies at a given speed according to the second envelope, every negative vertical acceleration of the air vehicle is at most about as small as a minimum negative vertical acceleration of the air vehicle; and (f) constructing a third envelope for the second envelope, the third envelope being constrained so that if the air vehicle flies at the given speed according to the third envelope, every positive vertical acceleration of the air vehicle is at most about as great as a maximum positive vertical acceleration of the air vehicle.

According to the present invention there is provided a method of designing a terrain-following flight profile for an air vehicle, including the steps of: for each of a plurality of frames: (a) providing a respective terrain profile; and (b) transforming the respective terrain profile into at least a portion of the terrain-following flight profile in accordance with at least one performance parameter of the air vehicle.

According to the present invention there is provided a method of designing a terrain-following flight profile for an air vehicle, including the steps of: (a) providing a terrain profile; and (b) filtering the terrain profile by steps including: (i) selecting a filter length, and (ii) constructing an envelope of the terrain profile in accordance with the filter length, the terrain-following flight profile then being based on the envelope.

According to the present invention there is provided a method of navigating an air vehicle within a flight corridor, including the steps of: (a) partitioning the flight corridor among a set of at least one frame; and (b) as the air vehicle enters each of the at least one frame: (i) defining a respective terrain profile with respect to a respective portion of the flight corridor that lies within the each frame, and (ii) transforming the respective terrain profile into a respective flight profile for the each frame in accordance with at least one performance parameter of the air vehicle.

According to the present invention there is provided an air vehicle including: (a) a memory for storing a map; (b) a processor for: (i) partitioning a flight corridor among a set of at least one frame, and (ii) as the air vehicle enters each of the at least one frame: (A) based on the map, providing a respective terrain profile for a respective portion of the flight corridor that lies within the each frame, and (B) transforming the respective terrain profile into a respective terrain-following flight profile for the each frame in accordance with at least one performance parameter of the air vehicle; and (c) a propulsion and guidance system for flying the air vehicle within the flight corridor in accordance with the at least one respective flight profile.

According to the present invention there is provided a method of designing a terrain-following flight path for an air vehicle, including the steps of: (a) providing a terrain profile; and (b) transforming the terrain profile into the terrain-following flight path in accordance with a desired tradeoff between a closeness with which the terrain-following flight path tracks the terrain profile and an ease of maneuver of the air vehicle.

The present invention has two principle aspects. The first aspect is the non-iterative transformation of a terrain profile into a terrain-following flight profile, in accordance with one or more air vehicle performance parameters. The second aspect is low-pass spatial filtering of the terrain profile prior to the construction of the flight profile. Together, these two aspects of the present invention provide the ability to trade off between the closeness with which the air vehicle follows the terrain and the gentleness of the maneuvers executed by the air vehicle.

Preferably, the terrain profile is defined with reference to a flight corridor. Indeed, the first aspect of the present invention can be viewed as a method of navigating the air vehicle within a given flight corridor. As noted above, in the case of an unmanned air vehicle, the "flight corridor" is actually a flight path.

Preferably, the terrain profile is transformed into the flight profile in a manner that directly adapts the terrain profile to the performance parameters of the air vehicle. This is in contrast to prior art methods that obtain a flight profile by fitting functions such as polynomials to the terrain profile. The difference between the direct adaptation of the present invention and the indirect adaptation of those prior art methods can be appreciated by considering what kind of flight profile is produced from a flat or gently varying terrain profile. The prior art methods produce a flight profile whose shape reflects both the shape of the terrain profile and the shapes of the functions that are fitted to the terrain profile. The method of the present invention produces a flight profile that is exactly parallel to the terrain profile.

Preferably, the flight profile is constructed as an envelope of the terrain profile that is constrained in accordance with at least one performance parameter of the air vehicle. Preferably, four performance parameters are accounted for: a maximum allowed climb slope, a minimum allowed dive slope, a minimum allowed negative vertical acceleration as the air vehicle flies at a given speed, and a maximum allowed positive vertical acceleration as the air vehicle flies at the given speed. Preferably, the flight profile is constructed in three steps. In the first step, a first envelope of the terrain profile is constructed subject to the constraints that every positive slope of the first envelope is at most about as great as the maximum allowed climb slope and that every negative slope of the first envelope is at most about as small as the minimum allowed dive slope. In the second step, a second envelope is constructed as an envelope of the first envelope, subject to the same constraints as the first envelope, and also to the constraint that if the air vehicle were to fly at the given speed according to the second envelope as the flight profile, every negative vertical acceleration of the air vehicle would be at most about as small as the minimum allowed negative vertical acceleration. In the third step, a third envelope is constructed as an envelope of the second envelope, subject to the same constraints as the first envelope and also to the constraint that if the air vehicle were to fly at the given speed according to the third envelope as the flight profile, every positive vertical acceleration of the air vehicle would be at most about as great as the maximum allowed positive vertical acceleration. The third envelope is the desired flight profile.

Preferably, the flight profile is constructed in real time, in the sense that the flight profile is constructed while the air vehicle flies along a flight path corresponding to at least a portion of the terrain profile.

Preferably, the terrain profile is an inflated terrain profile.

Preferably, the terrain profile is filtered prior to the construction of the flight profile, also in real time, in the sense that the filtering is done while the air vehicle flies along a flight path corresponding to at least a portion of the terrain profile. As noted above, the preferred filtering method is itself an independent aspect of the present invention. A filter length is selected, and an envelope of the terrain profile is constructed in accordance with the filter length and is substituted for the terrain profile in the construction of the flight profile. Preferably, this envelope is piecewise linear. More preferably, this envelope is constructed by selecting a plurality of points of the terrain profile and connecting neighboring pairs of points with straight line segments. Most preferably, the points are selected, starting with a first point of the terrain profile as a pivot point, by downwardly pivoting a filtering line segment, whose horizontal extent is equal to the filter length, about the pivot point until the filtering line segment contacts the terrain profile, selecting the last point at which the filtering line segment contacts the terrain profile, moving the pivot point to the last point at which the filtering line segment contacts the terrain profile, and repeating the process until the last point at which the filtering line segment contacts the terrain profile is the last point of the terrain profile.

From another point of view, the two aspects of the present invention can be considered to be stages in the transformation of a terrain profile into a terrain-following flight path in accordance with a desired tradeoff between the closeness with which the flight path tracks the terrain profile and the ease of maneuver of the air vehicle as the air vehicle attempts to fly according to the flight path. In particular, the filter length of the second aspect preferably is selected in accordance with the desired tradeoff.

Most commonly, the flight path is partitioned among a plurality of frames, a respective terrain profile is provided for each frame as the air vehicle enters the frame, and a corresponding respective flight profile is constructed as described above for each frame. The overall flight profile then is a concatenation of the individual respective flight profiles. Typically, the frames overlap, and this "concatenation" actually is a concatenation of the initial portions of the individual respective flight profiles, until the last frame is reached, at which point the entire respective flight profile of the last frame is concatenated to the overall composite flight profile. The air vehicle then is flown in accordance with the concatenated flight profile.

Preferably, the providing of the respective terrain profile of each frame is done by providing a digital terrain map that includes a plurality of elevations and then, at each of a plurality of points along a nominal flight path within the frame, determining a maximum elevation within an uncertainty interval around that point. The resulting set of maximum elevations, as a function of the points along the nominal flight path, is the desired terrain profile.

An air vehicle of the present invention includes an on-board memory, an on-board processor, and a propulsion and guidance system. The memory is used to store a map. The processor partitions the flight path among a set of frames. As the air vehicle enters each frame, the processor provides a respective terrain profile for the respective portion of a flight corridor that lies within the frame. This terrain profile is based on the map that is stored in the memory. Then the processor transforms the respective terrain profile into a respective flight profile for the frame in accordance with at least one performance parameter of the air vehicle. The propulsion and guidance system then is used to fly the air vehicle along the flight path in accordance with the flight profile until the next frame is reached.

Preferably, the map is a digital terrain map.

Preferably, each flight profile is a terrain-following flight profile.

Preferably, for example if the air vehicle is unmanned, the "flight corridor" is actually a flight path.

BRIEF DESCRIPTION OF THE DRAWINGS

The invention is herein described, by way of example only, with reference to the accompanying drawings, wherein:

FIGS. 2A-2C illustrate the geometric construction that is used to filter a terrain profile;

FIGS. 3A-3D show the templates that are used to construct the flight profile shaping envelopes;

FIGS. 7A and 7B illustrate the replacement of excessive upward curvatures with upward curvatures that are consistent with a maximum upward acceleration;

FIG. 9 illustrates a problematic interaction, between two successive frames, that is accounted for by an appropriate choice of frame length;

DESCRIPTION OF THE PREFERRED EMBODIMENTS

The present invention is of a method of designing a terrain-following flight profile.

The principles and operation of terrain following according to the present invention may be better understood with reference to the drawings and the accompanying description.

Figure 1A:
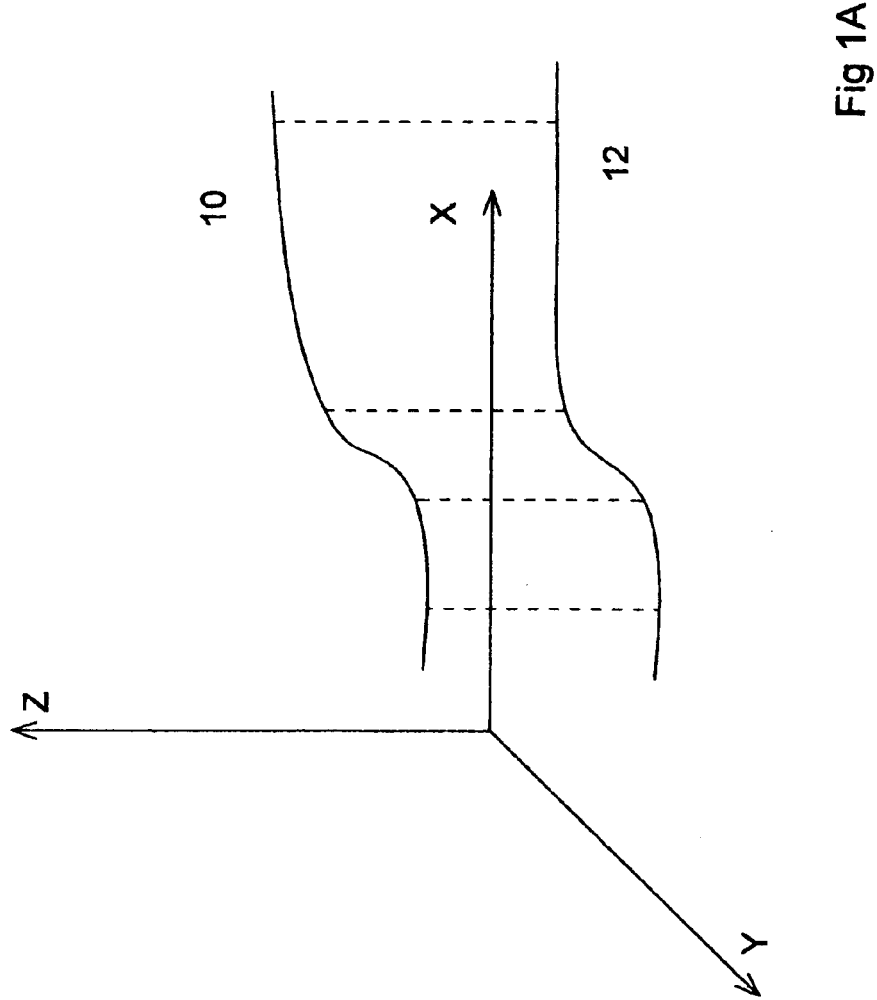
FIGS. 1A and 1B illustrate the coordinate system used herein to describe the method of the present invention.
Figure 1B:
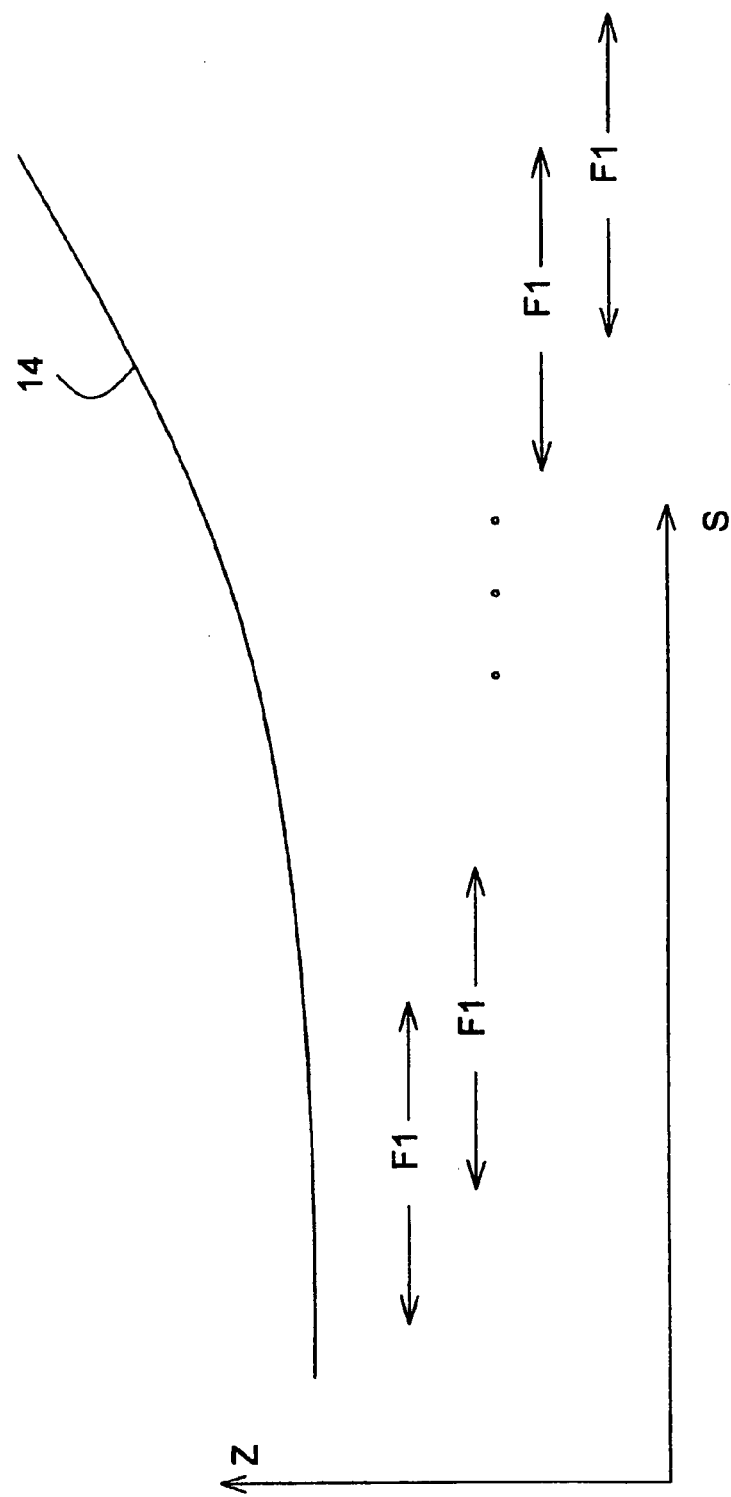

Referring now to the drawings, FIGS. 1A and 1B illustrate the coordinate systems used herein. FIG. 1A shows a trajectory 10 of an air vehicle flying in a three-dimensional space defined by Cartesian coordinates x, y and z. z is the altitude coordinate. x and y are geographic coordinates, for example north and east as in the Universal Transverse Mercator grid. Note that this coordinate system is a left-handed coordinate system. The corresponding flight path 12 is the projection of trajectory 10 onto the x,y plane. FIG. 1B shows the corresponding flight profile 14: the z-coordinate of trajectory 10 as a function of horizontal distance s along flight path 12. The air vehicle flies in the direction of increasing s, which in the relevant Figures is from left to right.

Typically, the various profiles (terrain profiles, flight profile) considered herein are sampled at discrete sample points $s_i$ along flight path 12. In the subsequent discussion, these sample points usually are assumed to be a constant interval ds apart. It will be clear to those ordinarily skilled in the art how to modify the subsequent discussion to account for irregular sampling of the distance coordinate s.

FIG. 1B also shows that flight path 12 is partitioned among a set of overlapping frames $F_1$ through $F_N$. As the air vehicle flies along flight path 12, the air vehicle first enters frame $F_1$, then frame $F_2$, etc. In the subsequent discussion, the air vehicle is considered to be flying in the local frame with the highest index. So, for example, after the air vehicle enters frame $F_2$, the air vehicle is considered to be flying in frame $F_2$ even though the s-coordinate of the air vehicle is still within frame $F_1$.

Typically, the interval between the left end of a frame and the left end of the next frame is a constant distance $\Delta s$ along flight path 12. Alternatively, the interval between the left end of every frame (other than the last frame) and the left end of the next frame is chosen so that the air vehicle spends the same time interval $\Delta t$ flying from the left end of one frame to the left end of the next frame. $\Delta s$ is selected in accordance with factors that include terrain complexity, the computational power available to the air vehicle, the rate of increase of navigational uncertainty and the frequency of navigational updates. As discussed below, all the frames except for the frames at the end of flight path 12 are given a common length chosen in advance in accordance with regional terrain roughness.

The problem addressed herein is the terrain-following problem: given a terrain profile, i.e., an estimate of terrain altitude along flight path 12, design a trajectory 10 for an air vehicle to fly as close as is feasible to the terrain along flight path 12. Because flight path 12 is given in advance (and indeed is fixed a priori if the air vehicle is unmanned), this is equivalent to designing a flight profile 14 for the air vehicle.

More specifically, the present invention addresses the real-time terrain-following problem. Flight path 12 is a reference flight path, i.e., a nominal flight path that the air vehicle attempts to follow. Because of navigational uncertainties and similar sources of error, the actual flight path followed by the air vehicle, i.e., the projection to a horizontal plane of the actual trajectory flown by the air vehicle, only approximates the reference flight path. Similarly, the flight profile provided to the air vehicle by the present invention is a reference flight profile that is only approximated by the altitude coordinate of the actual trajectory flown by the air vehicle. The present invention provides the air vehicle with a reference flight profile that is adapted in real time to the contingencies of flight. This is accomplished in three phases: terrain profile inflation, terrain profile filtering and flight profile shaping. For each frame, all three phases are effected as soon as the air vehicle enters the frame, to provide a reference flight profile that the air vehicle attempts to follow until the air vehicle enters the next frame.

Phase I: Terrain Profile Inflation

The input to this phase is the reference flight path, a digital terrain map of the region that includes the reference flight path, and, for a manned air vehicle, the width of the allowed flight corridor to the sides of the reference flight path. If it could be guaranteed that both the altitude and the geographical coordinates of the air vehicle were always known with perfect accuracy, and that the digital terrain map was perfectly accurate, then the terrain altitude along the reference flight path could be used as the terrain profile that is input to the second and third phases. Because neither the altitude of the air vehicle nor the geographic coordinates of the air vehicle nor the terrain altitude are known with perfect accuracy, this nominal terrain profile must be "inflated" to guarantee that the air vehicle does not hit the ground.

The inflated terrain profile is constructed in two steps. The first step accounts for errors in lateral position. The second step accounts for altitude errors.

In the first step, a horizontal corridor is defined along the reference flight path. The width of the horizontal corridor is the root-mean-square sum of all the errors that contribute to the lateral positional uncertainty of the air vehicle, plus, in the case of a manned air vehicle, the width of the allowed flight corridor. At each one of a set of equally spaced points s along the reference flight path, the digital terrain map is sampled in a region (usually a rectangular or elliptical region) centered on at that point s. The maximum value of the digital terrain map within this region is taken as the terrain altitude at point s.

In the second step, at each point s, the root-mean-square sum, of all the errors that contribute to the vertical positional uncertainty of the air vehicle, is added to the terrain altitude from the first step. The resulting terrain profile is the "inflated" terrain profile that is input to the second phase.

The terrain profile is inflated in real time to exploit the following feature of air vehicle navigation. Generally, the contribution of navigational uncertainty to the width of the horizontal corridor of the first step tends to grow with time. Therefore, the width of the horizontal corridor of the first step also tends to grow with time. Occasionally, the air vehicle receives a relatively accurate navigational update that reduces the lateral navigational uncertainty of the air vehicle. For example, the air vehicle may use, for navigation, an on-board self-contained navigational instrument such as an inertial measurement unit, supplemented by occasional updates from a navigational instrument such as a GPS receiver that relies on external signals. When the accurate navigational update is received, the width of the horizontal corridor shrinks accordingly, as does the range of digital terrain map altitudes that contributes to the calculation of maximum terrain altitude at each point s in the first step. As a result, the inflation of the terrain profile becomes less severe, and the air vehicle is enabled to follow the terrain more closely than would have been possible without real-time inflation.

The relatively accurate navigational update often indicates that the air vehicle is farther from the reference flight path than was indicated by the self-contained navigational instrument. When this occurs, the aircraft is flown so as to approach the reference flight path. The horizontal corridor also is modified to account for the deviation of the actual lateral position of the air vehicle from the reference flight path.

Phase II: Terrain Profile Filtering

The input to this phase is the inflated terrain profile that is output by phase I.

The purpose of this phase is to allow a tradeoff between close following of the terrain and ease of maneuver. For this purpose, the inflated terrain profile is filtered. The length of the filter determines the tradeoff, with a short filter favoring close following of the terrain and a long filter favoring ease of maneuver.

Figure 2C:
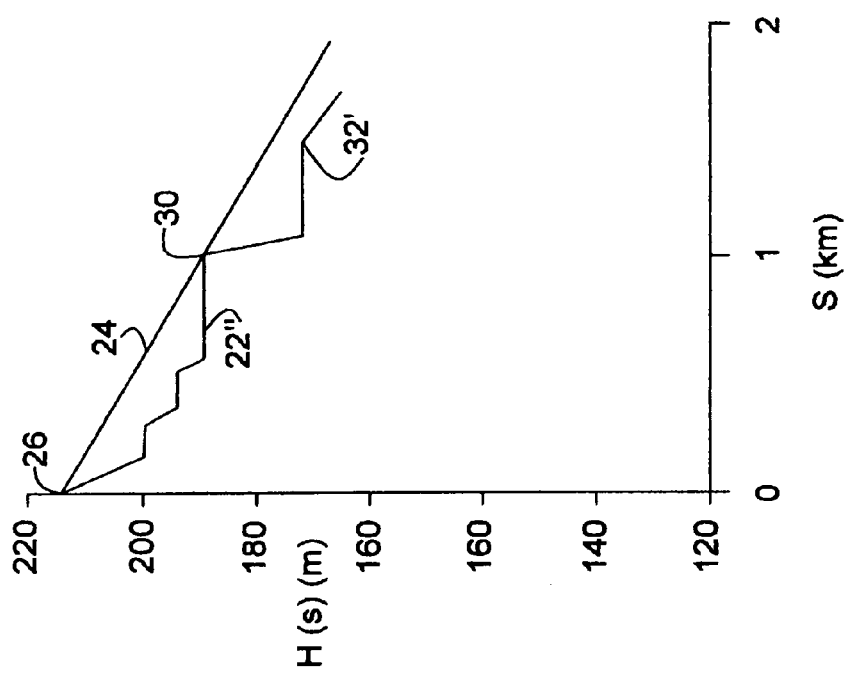

FIG. 2A illustrates the geometric construction that is used to transform an inflated terrain profile into a filtered terrain profile. FIG. 2A shows a 2 km long segment 22 of an inflated terrain profile H(s) along with a filtering line segment 24. Filtering line segment 24 is constructed to have a horizontal extent equal to a preselected filter length, which in this example is 2 km. The left end of terrain profile segment 22 is used as a pivot point 26, at which the left end of filtering line segment 24 is attached. Filtering line segment 24 is pivoted downward about pivot point 26, as indicated by the arrow, while maintaining the 2 km horizontal extent of filtering line segment 24 at the preselected filter length, until filtering line segment 24 contacts terrain profile segment 22 to the right of pivot point 26. The portion of filtering line segment 24 between pivot point 26 and the last point of contact 28 between terrain profile segment 22 and filtering line segment 24 then becomes a segment of a piecewise linear envelope of terrain profile H(s). In the example shown in FIG. 2A, filtering line segment 24 first contacts terrain profile segment 22 at only one point to the right of pivot point 26. FIG. 2B shows a terrain profile segment 22' such that when filtering line segment 24 first contacts terrain profile segment 22', this contact is at two points 30 and 32. In this case, the portion of filtering line segment 24 between pivot point 26 and the rightmost point of contact (point 32) is taken as the corresponding line segment of the piecewise linear envelope. Point 32 then becomes the next pivot point, for constructing the next line segment of the piecewise linear envelope. FIG. 2C shows a terrain profile segment 22" that is similar to terrain profile segment 22' except that instead of point 32, terrain profile segment 22" has a point 32' that is below filtering line segment 24 when filtering line segment 24 reaches point 30. In this case, the portion of filtering line segment 24 between pivot point 26 and the single point of contact (point 30) is taken as the corresponding line segment of the piecewise linear envelope; and point 30 then becomes the next pivot point.

Figure 2D:
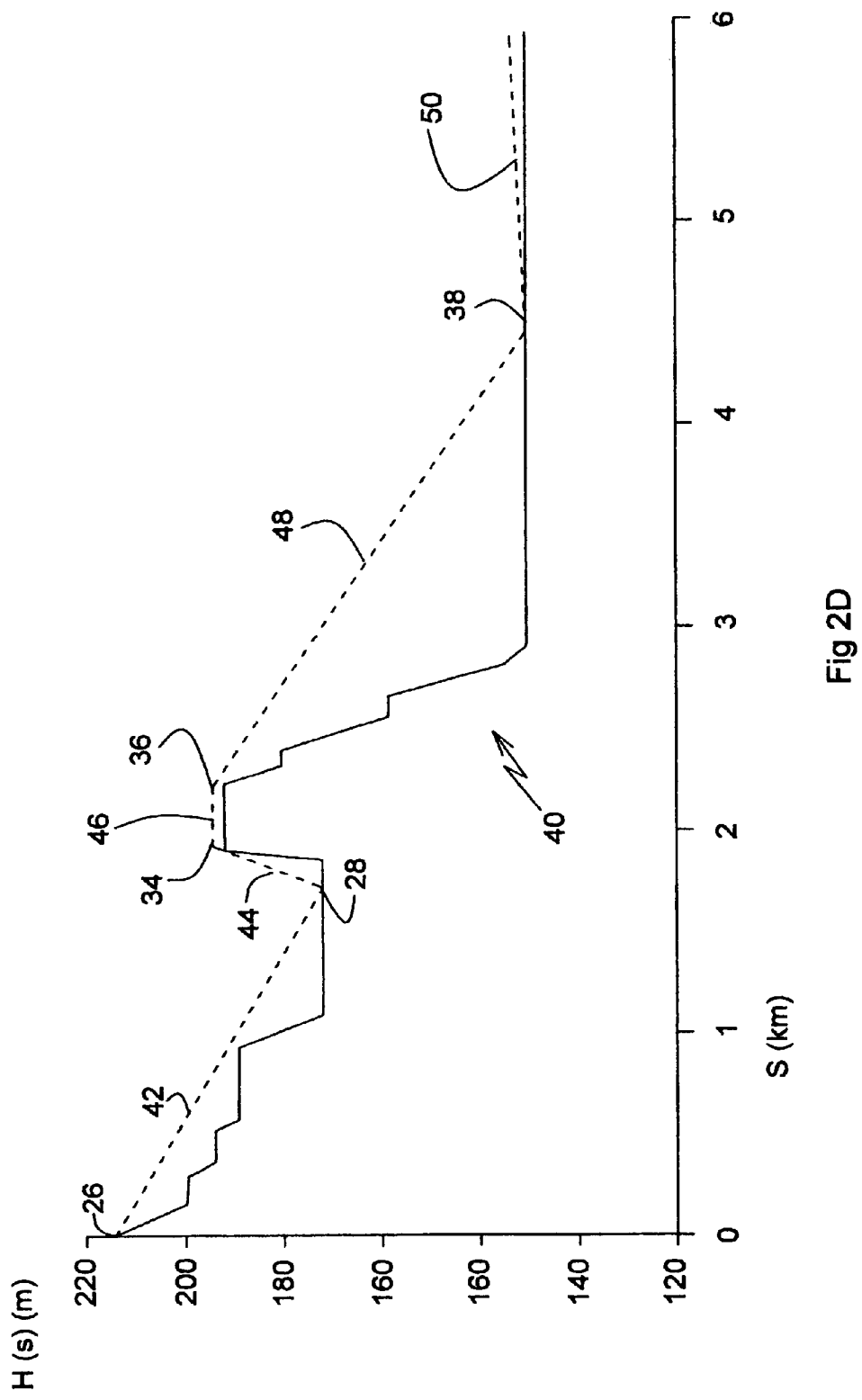
FIG. 2D shows a terrain profile before and after filtering.
Figure 3A:
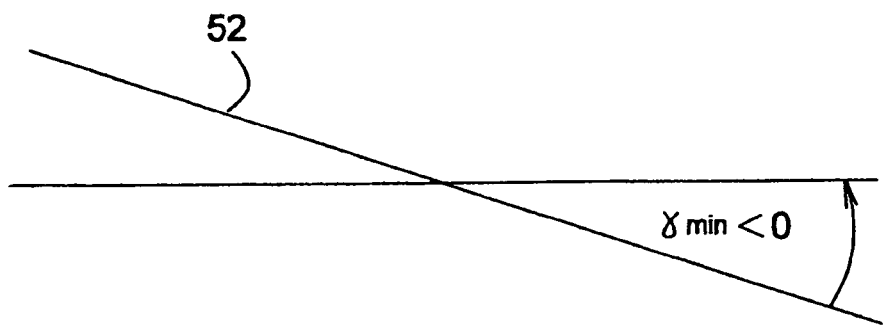
Figure 3B:
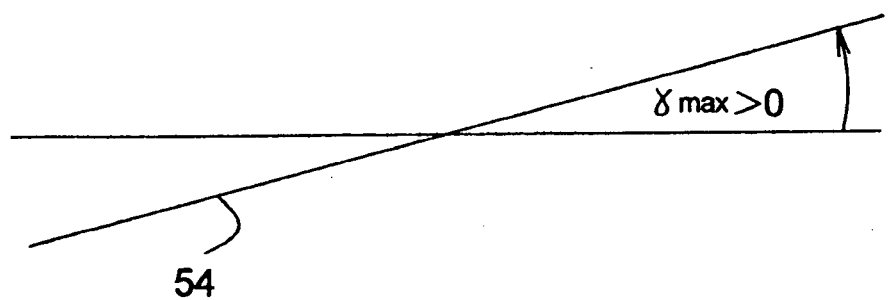

In FIG. 2D, solid line 40 is an inflated terrain profile H(s) of which terrain profile segment 22 is an initial portion. Dashed line segments 42, 44, 46, 48 and 50 are line segments of a piecewise linear envelope of terrain profile 40, constructed as described above. Line segment 42 is constructed as described above in connection with FIG. 2A. Line segment 44 is constructed by pivoting filtering line segment 24 downwards about point 28 as a pivot point until filtering line segment 24 contacts terrain profile 40 at point 34. Line segment 46 is constructed by pivoting filtering line segment 24 downwards about point 34 as a pivot point until filtering line segment 24 lies tangent to terrain profile 40 between points 34 and 36 (line segment 46 is illustrated in FIG. 2D as slightly displaced from terrain profile 40, for clarity). Line segment 48 is constructed by pivoting filtering line segment 24 downwards about point 36 as a pivot point until filtering line segment 24 contacts terrain profile 40 at point 38. Line segment 50 is constructed by pivoting filtering line segment 24 downwards about point 38 until filtering line segment 24 contacts terrain profile 40 at a point (not shown) to the right of the portion of terrain profile 40 that is illustrated in FIG. 2D. The piecewise linear envelope defined by line segments 42, 44, 46, 48, 50 and other line segments (not shown) to the right of the portion of terrain profile 40 that is illustrated in FIG. 2D constitute a filtered terrain profile.

For an inflated terrain profile that is defined as a set of discrete elevations $\{H_n\}$ at a set of discrete sample points $\{s_n\}$, the filtering algorithm, given a filter length L, is as follows:

Starting at the first sample point (n=1), consider all sample points $s_{j>n}$ such that $s_j - s_n \leq L$. At each such sample point $s_j$, compute the slope $m_j = (H_j - H_n)/(s_j - s_n)$. Let jmax be the index of the maximum slope. Draw a line segment from $(s_n, H_n)$ to $(s_{jmax}, H_{jmax})$. This line segment is a segment of the piecewise linear envelope that is the desired filtered terrain profile. Replace n with jmax and continue until the end of the current frame is reached.

Terrain profile filtering is performed on a per-frame basis. To preserve continuity of the filtered terrain profile, upon entering a new frame, if the filtered terrain profile of the old frame is higher than the first point of the inflated terrain profile of the new frame (which first point otherwise would be used as the first pivot point of the new frame), the point at which the filtered terrain profile of the old frame enters the new frame is used as the first pivot point of the new frame.

Phase III: Flight Profile Shaping

The input to this phase is the filtered terrain profile that is output by phase II.

This phase consists of three subphases. In the first subphase, an envelope of the input filtered terrain profile is constructed. In the second and third subphases, respective envelopes of the envelopes from the immediately preceding subphases are constructed. The envelope constructed by the third subphase is the desired flight profile.

The three envelopes are constructed to adapt the respective inputs to real time performance parameters of the air vehicle. The first subphase adapts the filtered terrain profile to the maximum climb angle $\gamma_{max}$ and the minimum dive angle $\gamma_{min}$, or equivalently, to the maximum climb slope $\tan \gamma_{max}$ and the minimum dive slope $\tan \gamma_{min}$ of the air vehicle. The second subphase adapts the output of the first subphase to the horizontal velocity component V of the air vehicle in the current frame and to the minimum negative vertical acceleration $a_{Zmin}$ of the air vehicle, in a manner that guarantees that the air vehicle flies horizontally above significant local elevation peaks. The third subphase adapts the output of the second subphase to the horizontal velocity component V of the air vehicle in the current frame and to the maximum positive vertical acceleration $a_{Zmax}$ of the air vehicle.

The three envelopes are constructed using the templates illustrated in FIGS. 3A-3D. The first subphase uses templates 52 and 54. Template 52 is a straight line with a slope $\tan \gamma_{min}$. Template 54 is a straight line with a slope $\tan \gamma_{max}$. The second subphase uses two templates 56 and 58 that are, respectively, the descending and ascending branches of a concave downward curve 60. The central portion of curve 60 is the concave downward parabolic trajectory flown by the air vehicle as the horizontal component of the air vehicle's velocity is V and as the air vehicle accelerates downward with a constant vertical acceleration of $a_{Zmin}$. The parabola continues rightward until the slope of the parabola reaches $\tan \gamma_{min}$. To the right of that point, the slope of the descending branch of curve 60 is a constant $\tan \gamma_{min}$. The parabola continues leftward until the slope of the parabola reaches $\tan \gamma_{max}$. To the left of that point, the slope of the ascending branch of curve 60 is a constant $\tan \gamma_{max}$. The third subphase uses a template 62 that is a concave upward curve. The central portion of template 62 is the concave upward parabolic trajectory flown by the air vehicle as the horizontal component of the air vehicle's velocity is V and as the air vehicle accelerates upward with a constant vertical acceleration of $a_{Zmax}$. The parabola continues rightward until the slope of the parabola reaches tan $\gamma_{max}$. To the right of that point, the slope of the ascending branch of template 62 is a constant tan $\gamma_{max}$. The parabola continues leftward until the slope of the parabola reaches tan $\gamma_{min}$. To the left of that point, the slope of the descending branch of template 62 is a constant tan $\gamma_{min}$.

The performance parameters to which the subphases adapt their respective envelopes often vary in time. For example, as an air vehicle consumes fuel and so becomes lighter, its maximum climb slope tan $\gamma_{max}$ and its maximum positive vertical acceleration $a_{Zmax}$ may increase. The values of the performance parameters actually used to shape the flight profile of any given frame are the values of the performance parameters as the air vehicle enters the frame.

In the subsequent discussion, it will be assumed that the input filtered terrain profile and the various envelope functions are defined as a set of discrete elevations $\{h_n\}$ at discrete sampling points $\{s_n\}$ a fixed distance ds apart. It will be obvious to those skilled in the art how to generalize this discussion to irregularly spaced sample points and to other representations, for example piecewise continuous polynomial representations of higher order than first order, of the terrain profile and of the envelope functions.

In the first subphase, positive slopes that are steeper than the air vehicle's maximum climb slope tan $\gamma_{max}$, and negative slopes that are steeper (in absolute value) than the air vehicle's minimum dive slope tan $\gamma_{min}$, are replaced with slopes that are consistent with the air vehicle's maximum climb slope and minimum dive slope. This is done in two passes.

The input to the first pass is the filtered terrain profile. Conceptually, in the first pass, template 52 is swept across the filtered terrain profile in the direction of decreasing s (right to left), and whenever template 52 contacts the filtered terrain profile at two points, the portion of the filtered terrain profile between the two points is raised to match template 52.

Figure 4A:
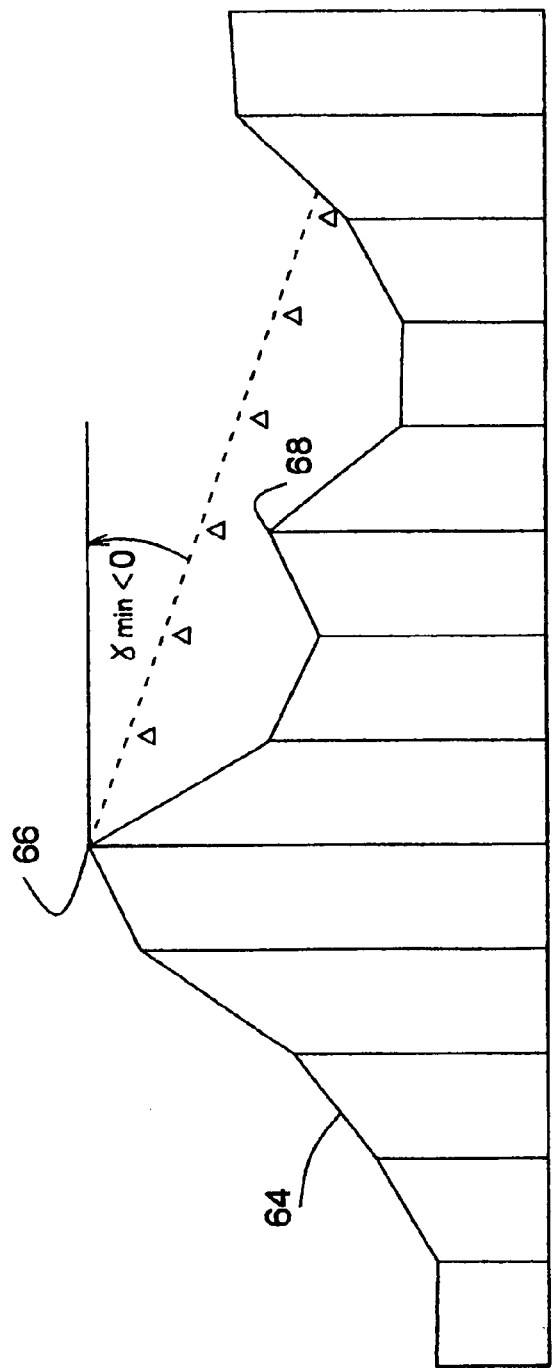
FIG. 4A illustrates the replacement of overly steep negative slopes with negative slopes that are consistent with a minimum dive slope.

The corresponding algebraic algorithm is as follows. The slope to the right of each sample point $s_n$ is $h'_n=(h_{n+1}-h_n)/ds$, If $h'_n<\tan\gamma_{min}$ then the elevations $h_{n+j}$ to the right of sample point $s_n$ are replaced with $h_n+j*ds*\tan\gamma_{min}$ until a sample point $s_{n+k}$ is found such that the input elevation $h_{n+k}$ there is greater than the replacement value. FIG. 4A shows a filtered terrain profile 64 with two elevations 66 and 68 such that the negative slopes immediately to the right of these elevations are less than tan $\gamma_{min}$. The elevations to the right of elevation 66 are replaced with the elevations marked by the triangles. Note that this construction need not be done for elevation 68 because the replacement elevations derived from elevation 66 are greater than the replacement elevations derived from elevation 68 in any case.

The input to the second pass is the output of the first pass. Conceptually, in the second pass, template 54 is swept across the output from the first pass in the direction of increasing s (left to right), and whenever template 54 contacts the output from the first pass at two points, the portion of the output from the first pass that lies between the two points is raised to match template 54.

Figure 4B:
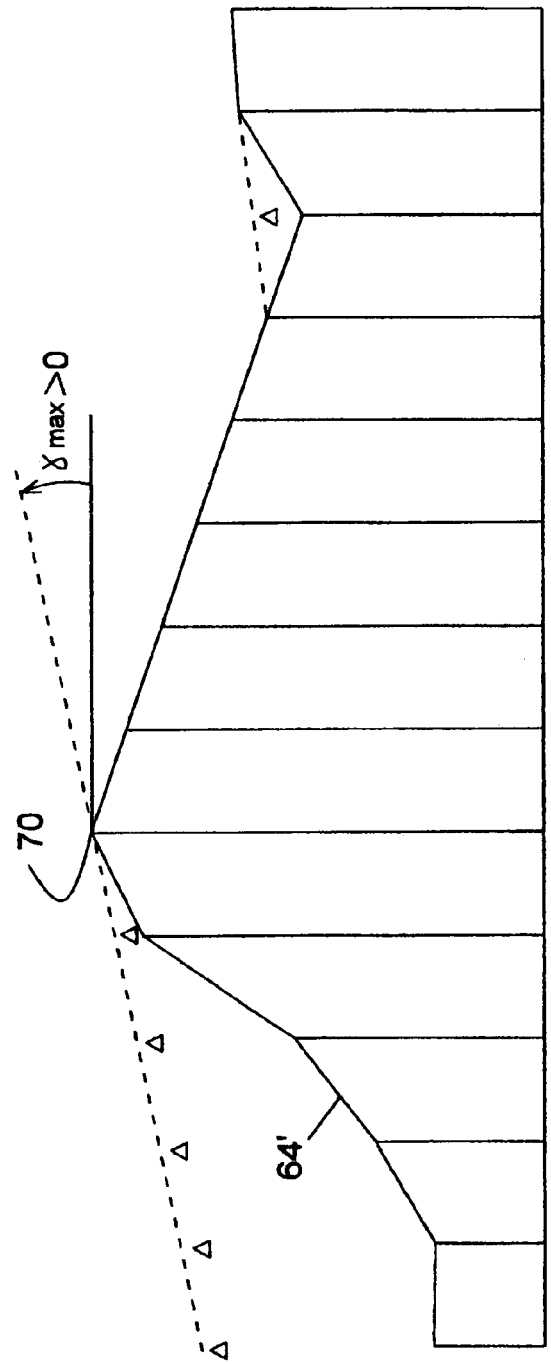
FIG. 4B illustrates the replacement of overly steep positive slopes with positive slopes that are consistent with a maximum climb slope.

The algebraic algorithm of the second pass is similar to the algebraic algorithm of the first pass, but considers the slopes to the left of the sample points. The slope to the left of each sample point $s_n$ is $h'_n=(h_n-h_{n-1})/ds$. If $h'_n>\tan\gamma_{max}$ then the elevations $h_{n-j}$ to the left of sample point $s_n$ are replaced with $h_n-j*ds*\tan\gamma_{max}$ until a sample point $s_{n-k}$ is found such that the input elevation $h_{n-k}$ there is greater than the replacement value. FIG. 4B shows the envelope 64' of filtered terrain profile 64 that was constructed in FIG. 4A, with two elevations 70 and 72 such that the positive slopes immediately to the left of these elevations are greater than tan $\gamma_{max}$. The elevations immediately to the left of elevations 70 and 72 are replaced with the elevations marked by the triangles.

In the second subphase, local downward curvatures that exceed the curvature associated with the combination of a horizontal velocity V and a minimum vertical acceleration $a_{Zmin}$ are replaced with downward curvatures that are consistent with this combination. This, too, is done in two passes, to ensure that the final flight profile is horizontal above local elevation maxima.

The input to the first pass is the envelope derived in the first subphase. Conceptually, in the first pass, template 56 is swept across the envelope from the first subphase in the direction of decreasing s (right to left). When a values of s is found such that the envelope from the first subphase has excessive downward curvature, template 56 is made tangent there to the envelope from the first subphase, and the portion of the envelope from the first subphase, that lies between the target value of s and the next intersection, to the right of the target value of s, of template 56 and the envelope of the first subphase, is raised to match template 56. Note that no negative slopes of the envelope from the first subphase are more negative than tan $\gamma_{min}$. Note also that in practice, the second derivative of the envelope from the first subphase is used as a proxy for the curvature.

The corresponding algebraic algorithm addresses the local second derivative h" with respect to s of the envelope from the first subphase. The minimum allowed second derivative is $h''_{min}=a_{Zmin}/[V^2 \cos^3 \gamma(s)]$, where $\gamma(s)$ is the arctangent of the slope of the envelope from the first phase at horizontal distance s along flight path 12. The numerical approximation that is used to calculate the second derivative at $s_n$ is $h''_n \approx (h'_n-h'_{n-1})/ds$. For the envelope from the first subphase to be considered to have excessive downward curvature at a sample point $s_n$ in the first pass, it must satisfy the following two conditions:

$$h''_n < h''_{min} \qquad (a)$$

and $$h'_n < h''_{min}*ds \qquad (b)$$

Figure 5A:
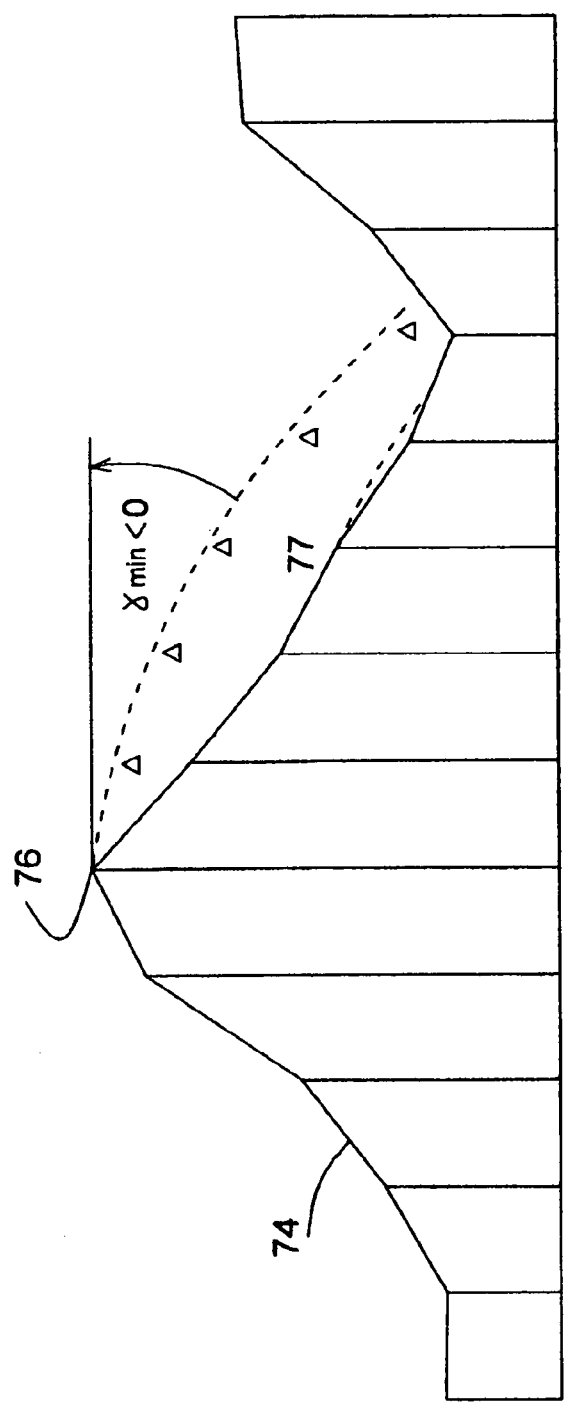
FIGS. 5A and 5B illustrate the replacement of excessive downward curvatures with downward curvatures that are consistent with a minimum vertical acceleration.

If $h'_{n-1}<0$, the first condition implies the second condition. The purpose of the second condition is to ensure that the final flight profile is flat at local maxima of the terrain profile, where $h'_{n-1}>0$. Starting from such a sample point $s_n$ and proceeding rightwards, the slopes $h'_{n+j}$, $j \geq 0$ to the right of $s_n$ are successively replaced by $\max[h'_{n+j-1}+(j+1)*h''_{min}*ds, \tan\gamma_{min}]$. Then, again starting from this sample point $s_n$, proceeding rightwards, and using these replacement slopes, the elevations $h_{n+j}$ to the right of this sample point $s_n$ are successively replaced by $h_{n+j-1}+h'_{n+j-1}*ds$, until a sample point $s_{n+k}$ is found such that the input elevation $h_{n+k}$ there is greater than the replacement value. FIG. 5A shows an envelope 74 derived in the first subphase, with two elevations 76 and 77 of excessive downward curvature according to the criteria of the first pass of the second subphase. The elevations to the right of elevation 76 are replaced with the elevations marked by the triangles. The elevation immediately to the right of elevation 77 would be replaced if not for the fact that the replacement elevation that is derived from elevation 76 is higher than the replacement elevation that would be derived from elevation 77. Note that the replacement slopes to the right of the third replacement elevation are equal to tan $\gamma_{min}$.

The input to the second pass is the output of the first pass. Conceptually, in the second pass, template 58 is swept across the output of the first pass, in the direction of increasing s (left to right). When a value of s is found such that the output of the first pass has excessive downward curvature, template 58 is made tangent there to the output of the first pass and the portion of the output of the first pass that lies between the target value of s and the next intersection, to the left of the target value of s, of template 58 and the output of the first pass, is raised to match template 58. Note that no positive slopes of the output of the first pass are more positive than tan $\gamma_{max}$. Note also that in practice, the second derivative of the output of the first pass is used as a proxy for the curvature.

As in the first pass, the corresponding algebraic algorithm also addresses the local second derivative h" with respect to s of the output of the first pass, but with a somewhat different condition for excessive downward curvature:

$$h"_n < h"_{min} \quad (a)$$

and $$h'_n > h"_{min} * ds \quad (b)$$

Figure 5B:
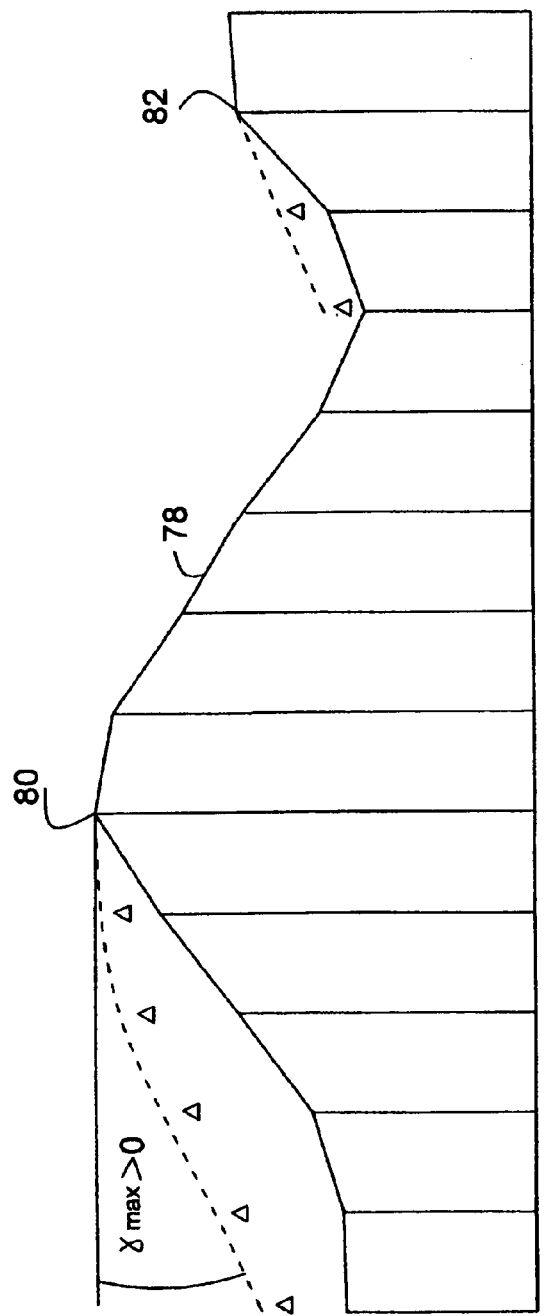

In other words, the second pass deals with the sample points, at which condition (a) is satisfied, that were not dealt with in the first pass. Starting from such a sample point $s_n$ and proceeding leftwards, the slopes $h'_{n-j}$, j>0, to the left of $s_n$ are successively replaced by min[$h'_{n-j+1} - j * h"_{min} * ds$, tan $\gamma_{max}$]. Then, again starting from the sample point $s_n$, proceeding leftwards, and using these replacement slopes, the elevations $h_{n-j}$ to the left of this sample point $s_n$ are successively replaced by $h_{n-j+1} + h'_{n-j} * ds$, until a sample point $s_{n-k}$ is found such that the input elevation $h_{n-k}$ there is greater than the replacement value. FIG. 5B shows an envelope 78 from the first subphase that has been subjected to the first pass of the second subphase, with two elevations 80 and 82 of excessive downward curvature according to the criteria of the second pass of the second subphase. The elevations to the left of elevations 80 and 82 are replaced with the elevations marked by the triangles. Note that the replacement slopes to the left of the third replacement elevation to the left of elevation 80 are equal to tan $\gamma_{max}$.

In the third subphase, local upward curvatures that exceed the curvature associated with the combination of a horizontal velocity V and a maximum vertical acceleration $a_{Zmax}$ are replaced with upward curvatures that are consistent with this combination. Because there is no associated constraint, related to local minima, that corresponds to the constraint of the second subphase that the flight profile must be horizontal at local maxima of the terrain profile, this replacement is done in a single pass.

The input to the third subphase is the envelope derived in the second subphase. Conceptually, template 62 is lowered as far as possible into the valleys of the envelope from the second subphase. Any valley in which template 62 contacts the two walls of the valley, instead of contacting the valley floor, has excessive upward curvature. The portion of the envelope from the second subphase that lies between the two contact points is raised to match template 62.

The corresponding algebraic algorithm addresses the local second derivative h" with respect to s of the envelope from the second subphase. The maximum allowed second derivative is $h"_{max} = a_{Zmax}/[V^2 \cos^3 \gamma(s)]$. The numerical approximation of the second subphase is used to calculate the second derivative at all sample points $s_n$, from left to right.

Figure 6:
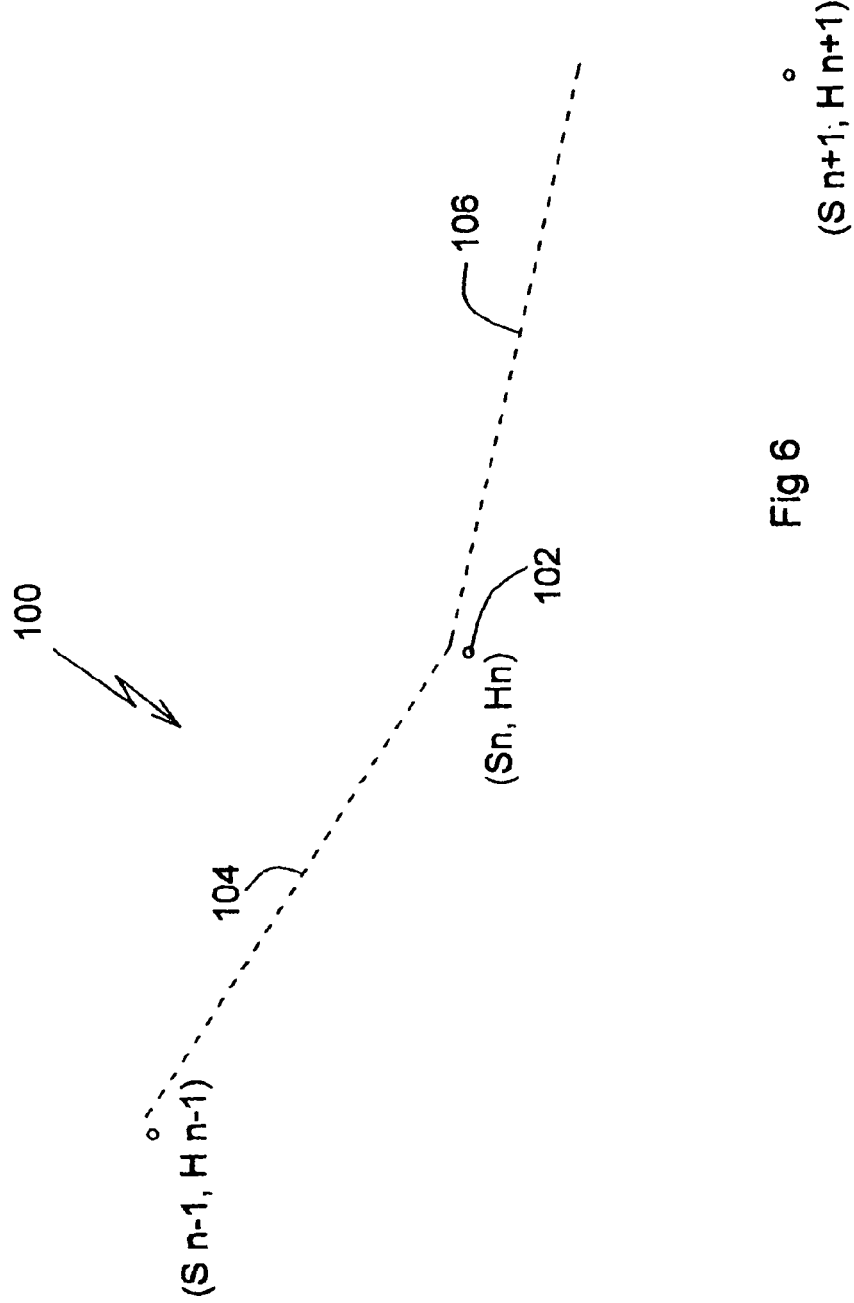
FIG. 6 illustrates the launching of a piecewise linear approximation of the template of FIG. 3D.

FIG. 6 illustrates the geometric construction that is used to fit template 62 to the envelope from the second subphase. Considering the envelope to be a set of discrete points $\{(s_n, h_n)\}$, this construction is the "launch", towards the right of one of the points, of a continuous, piecewise linear approximation 100 of template 62 that is tangent to the envelope immediately to the left of a launch point 102. If the slope of the envelope immediately to the left of launch point 102 is $h'_{n-1}$, then the slope of segment 104 of approximation 100 that is tangent to the envelope also is $h'_{n-1}$. The slope of the next segment 106 of approximation 100 then is $h'_{n-1} + h"_{max} ds$, the slope of the segment immediately to the right of segment 106 is $h'_{n-1} + 2h"_{max} ds$, and so on until the slope reaches tan $\gamma_{max}$.

For each sample point $s_n$ with an excessive second derivative, two such piecewise linear approximations of template 62 are launched from two adjacent points of the envelope from the second subphase. The first attempt to construct the piecewise linear approximations is made at sample points $s_n$ and $s_{n-1}$. Because sample point $s_n$ has an excessive second derivative, the piecewise linear approximation that is launched from sample point $s_n$ is guaranteed to be below the envelope from the second subphase, at least initially. If the piecewise linear approximation that is launched from sample point $s_{n-1}$ is tangent to the envelope from the second subphase at a sample point somewhere to the right of sample point $s_n$, and is above the envelope from the second subphase between sample point $s_{n-1}$ and the point of tangency, then the portion of this piecewise linear approximation between its launch point and its point of tangency defines the desired flight profile between those two points. If the piecewise linear approximation that is launched from sample point $s_{n-1}$ is entirely above the envelope from the second subphase, then the desired flight profile must lie somewhere between the "lower" piecewise linear approximation that is launched from sample point $s_n$ and the "upper" piecewise linear approximation that is launched from point $s_{n-1}$. A third polygonal approximation to template 62 is found that, having been launched from sample point $s_{n-1}$ but with a slope intermediate between the first two piecewise linear approximations, is tangent to the envelope from the second subphase. The portion of the third polygonal approximation between its launch point and its point of tangency defines the desired flight profile between those two points. If the "upper" piecewise linear approximation intersects the envelope from the second subphase, then the construction is repeated for the pair of sample points ($s_{n-1}, s_{n-2}$), and so on, until a pair of sample points is found such that the piecewise linear approximation launched from the rightmost of the two sample points intersects the envelope from the second subphase and the piecewise linear approximation launched from the leftmost of the two sample points is tangent to or entirely above the envelope from the second subphase.

The third polygonal approximation is found as follows, in the general case of the "upper" piecewise linear approximation emerging from the envelope from the second subphase at sample point $s_{n-j}$ and the "lower" piecewise linear approximation emerging from the envelope from the second subphase at sample point $s_{n-j+1}$. Denote the sample point immediately to the right of the intersection of the "lower" piecewise linear approximation with the envelope from the second subphase as "$s_m$". Then the slope of the first segment of the third piecewise linear approximation is given by $$h'=h'_L+\Delta h/(s_m-s_{n-j})$$

where $h'_L$ is the slope of the first segment of the "lower" piecewise linear approximation and $\Delta h$ is the depth of the "lower piecewise linear approximation below the envelope from the second subphase at sample point $s_m$.

FIG. 7A shows an example of an envelope 84, from the second subphase, that has an excessive second derivative at a point 86. A "lower" piecewise linear approximation 88 to template 62 is launched from the point 94 immediately to the left of point 86 and intersects envelope 84 to the right of point 86. An "upper" piecewise linear approximation 90 to template 62 is launched from the point 96 immediately to the left of point 94 and lies entirely above envelope 84. A third piecewise linear approximation 92 to template 62 is found as described above that, having been launched from point 96, is tangent to envelope 84 at a point 98 to the right of point 94. Piecewise linear approximation 92 defines the desired flight profile between points 96 and 98.

FIG. 7B shows a similar envelope 84', from the second subphase, in which piecewise linear approximation 88 to template 62 is tangent to envelope 84' at a point 98'. Piecewise linear approximation 88 defines the desired flight profile between points 94 and 98. If piecewise linear approximation 88 were entirely above envelope 84', then the procedure described above would be used to find a piecewise linear approximation to template 62 that is below piecewise linear approximation 88, and that is tangent to envelope 84', to serve as the desired flight profile between point 94 and the point of tangency.

Phase III: Boundary Conditions

The flight profile must connect smoothly to the "normal" trajectory along which the air vehicle flies before entering the terrain-following flight profile and after exiting the terrain-following flight profile. In addition, the flight profile computed for one frame must connect smoothly to the flight profile of the next frame. In practice, this means that the start of the third subphase envelope of a frame subsequent to the first frame must connect smoothly to the middle of the third subphase envelope of the immediately preceding frame, at the point in the immediately preceding frame where the new frame starts, because the final, composite flight profile is a concatenation of the initial parts of all the third subphase envelopes of all but the last frame, plus the entire third subphase envelope of the last frame. The initial altitude h and flight angle $\gamma$ must be defined for all the frames, as must the final altitude h and flight angle $\gamma$ of the last several frames. Usually, this is done by replacing the first two elevations of the inflated and filtered terrain profile, at the beginning of each frame, with the elevations $h_0$ and $h_0+\tan\gamma_0 ds$, respectively, where $h_0$ is the altitude of the previous flight profile upon entry to the frame (as defined by the normal trajectory upon entering the first frame, or by the flight profile of the previous frame upon entering one of the other frames) and $\gamma_0$ is the corresponding flight profile angle; and by replacing the last two elevations of the inflated and filtered profile of the last several frames with the elevations $h_f\tan\gamma_f ds$ and $h_f$, where $h_f$ is the desired altitude of the air vehicle upon leaving the flight profile and $\gamma_f$ is the corresponding flight profile angle. The flight profile shaping algorithm presented above then is executed on the thus-adjusted inflated and filtered terrain profile.

There are two situations in which this default rule does not work.

Figure 8:
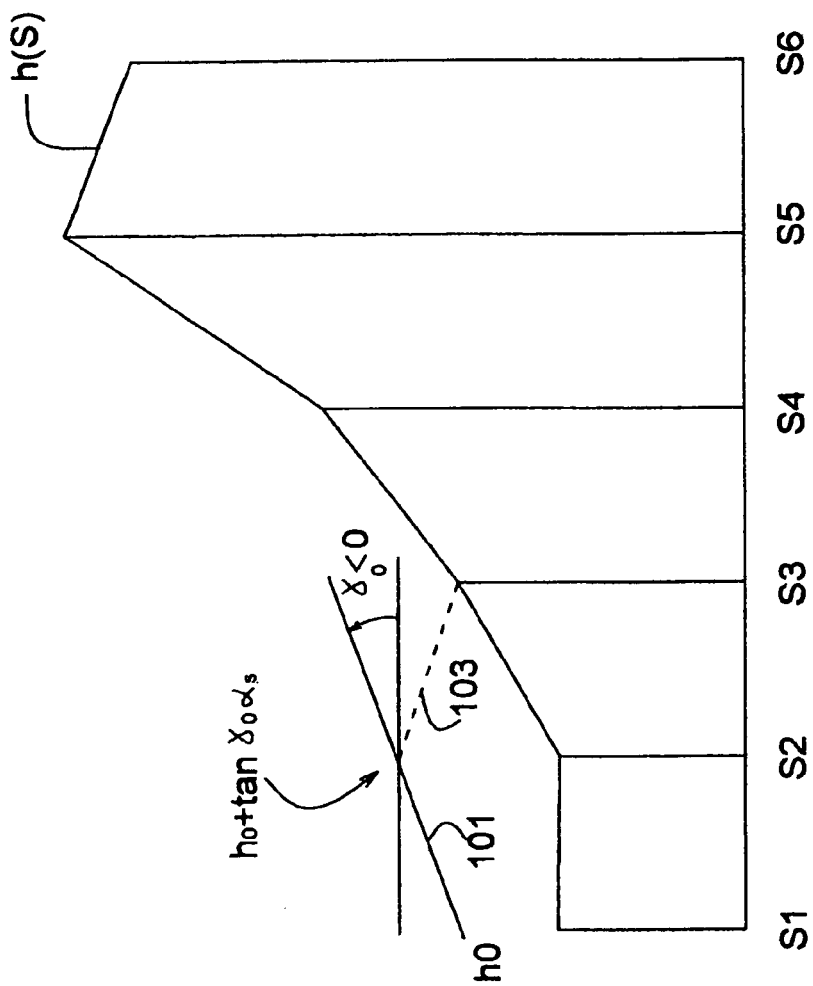
FIG. 8 illustrates a problematic boundary condition that creates a fictitious local elevation maximum.

The first situation is illustrated in FIG. 8, which shows an inflated and filtered terrain profile h(s). $\gamma_0>0$ and the third elevation $h(s_3)$ of inflated and filtered terrain profile h(s) is lower than $h_0+\tan\gamma_0 ds$. In that case, the default rule substitutes line segments 101 and 103 for the first two line segments of terrain profile h(s), thereby creating a fictitious local elevation maximum at the second sample point $s_2$ of the frame, and the flight profile shaping algorithm seeks to create a flight profile that is horizontal at $s_2$. The solution to this problem is to create, instead, an ad hoc flight profile that starts from altitude $h_0$ with the flight angle $\gamma_0$ and flattens out to horizontal at the minimum allowed acceleration $a_{Zmin}$. An analogous procedure is followed at the end of the last frame if $\gamma_f<0$ and the third from last elevation of the inflated and filtered profile is lower than $h_f\tan\gamma_f ds$.

The second situation is related to the third subphase. Recall that the "third" piecewise linear approximation, that defines the flight profile, is at the maximum allowed acceleration $a_{Zmax}$. If a frame, subsequent to the first frame, starts at a point in the previous frame at which the flight profile was defined in this way, then, because of numerical uncertainty, the flight profile computed for the previous frame is liable to intersect the envelope that is computed by the second subphase of the phase III algorithm, rather than be tangent to that envelope. The algorithm would then seek to back off (to the left) by another sample point; but because the algorithm is operating at the beginning of a frame, there is no sample point to back off to. Therefore, the initial flight slope is increased sufficiently to keep the flight profile from intersecting the envelope that is computed by the second subphase.

One more interaction between frames must be anticipated, as illustrated in FIG. 9. FIG. 9 shows two successive frames 110 and 112, the associated terrain profile 114, and the flight profile 116 computed as described above for frame 110. Terrain profile 114 includes a cliff 120 in frame 112 but not in frame 110. An extension 118 of flight profile 116 past the right end of frame 110 constrained by the maximum allowed upward acceleration $a_{Zmax}$ and the maximum allowed climb angle $\gamma_{max}$ intersects cliff 120, so that an air vehicle flying according to flight profile 116 would crash into cliff 120. This problem is handled by making the frames sufficiently long. The minimum frame length should be at least as great as the longest distance between two points, of the regional map from which the nominal terrain profile is obtained, such that the slope of the line of sight between the two points is greater than or equal to $\tan\gamma_{max}$.

EXAMPLE

The following Figures are taken from a study in which the method of the present invention was applied to a 110 Km long terrain profile.

Figure 10A:
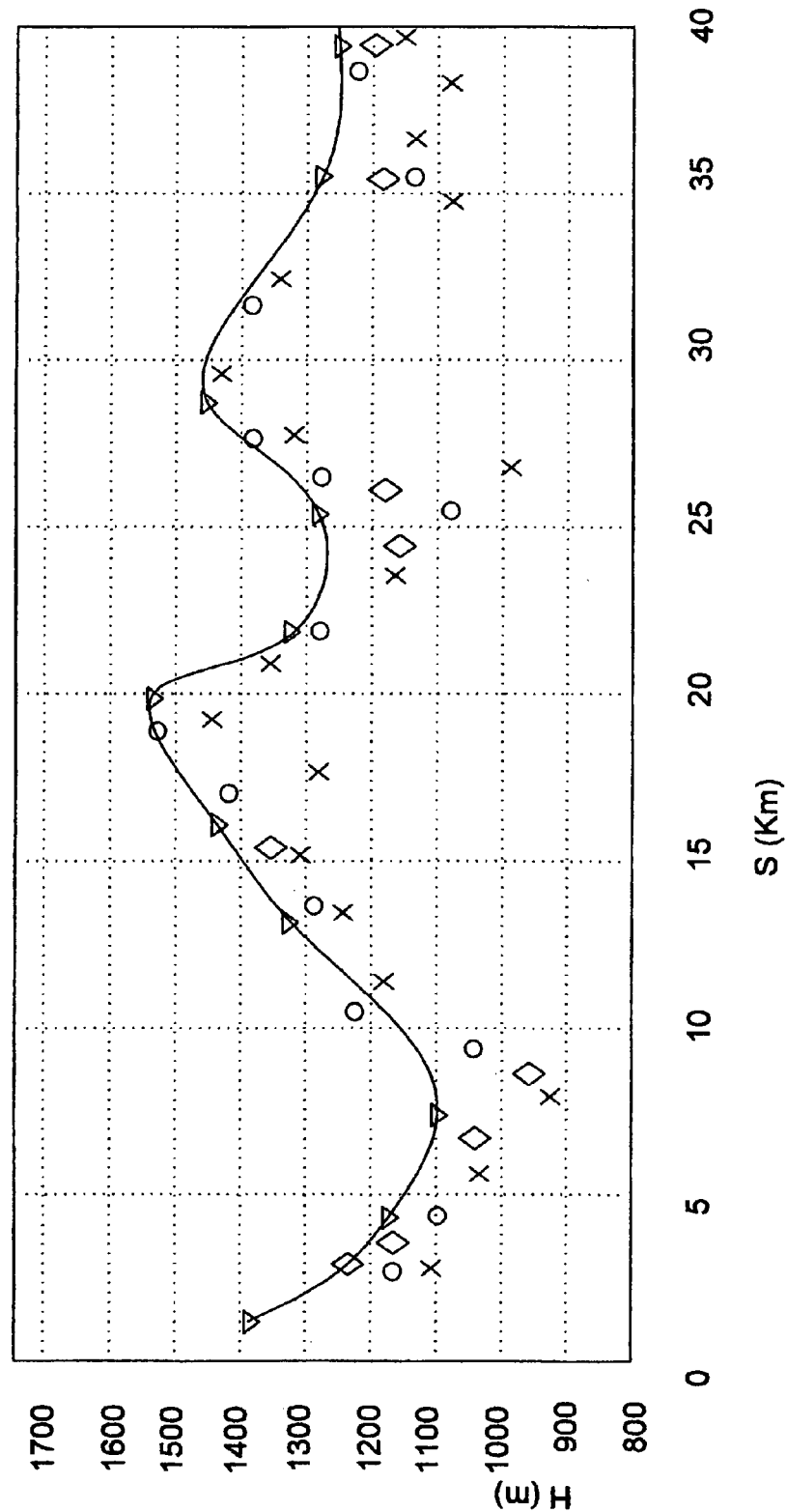
FIGS. 10A-10C show respective portions of a terrain profile and three corresponding flight profiles computed for a terrain profile filtered with filters of various lengths.
Figure 10B:
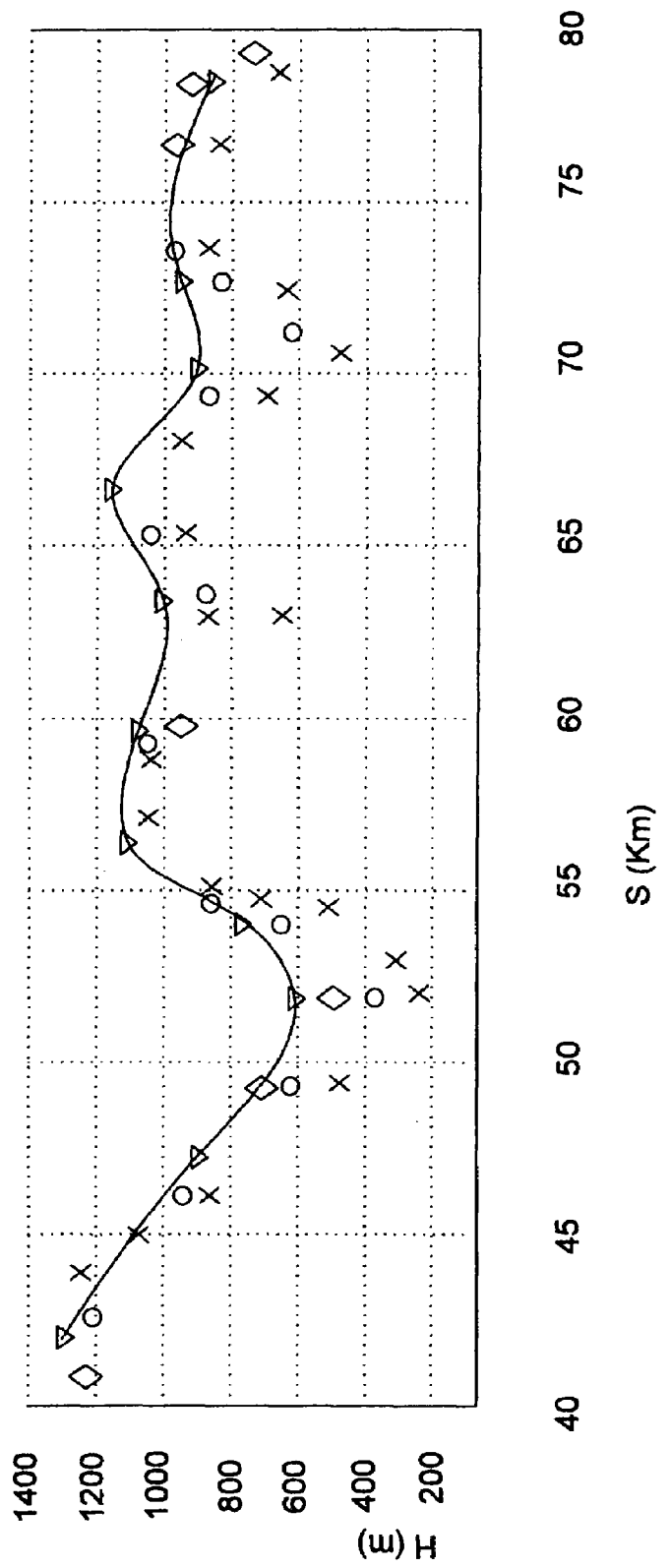
Figure 10C:
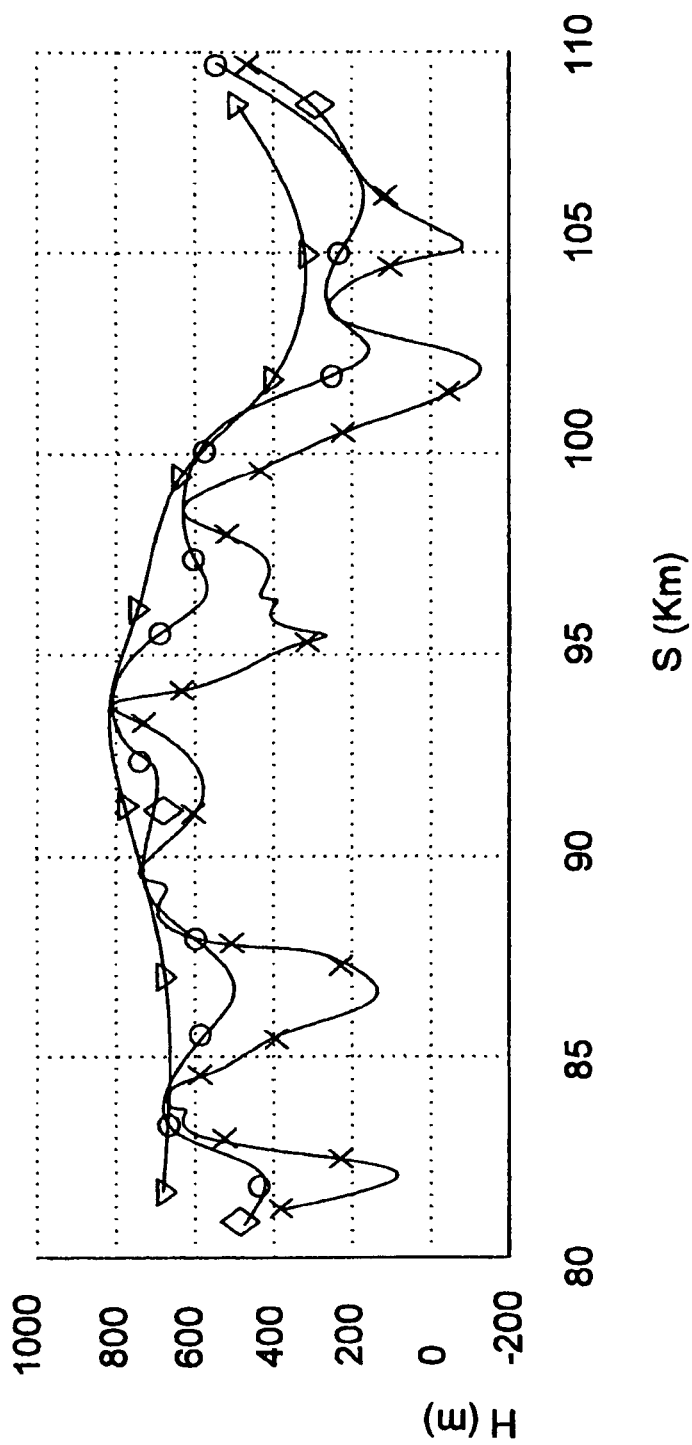

FIGS. 10A, 10B and 10C show, respectively, three different portions of the terrain profile (marked with X's), along with three flight profiles. The flight profile marked with diamonds was computed without filtering the terrain profile. The flight profile marked with circles was computed after filtering the terrain profile with a 1 Km long filter. The flight profile marked with triangles was computed after filtering the terrain profile with a 3.5 Km long filter. FIG. 10A shows the first 40 Km of the terrain profile and the three flight profiles. FIG. 10B shows the next 40 Km of the terrain profile and the three flight profiles. FIG. 10C shows the last 30 Km of the terrain profile and the three flight profiles. Overall, the flight profile that was computed using a relatively short 1-Km filter follows the terrain profile better than either the flight profile that was computed without filtering or the flight profile that was computed using a relatively long 3.5 Km filter. The 3.5 Km long filter, however, produces a flight profile that requires gentler maneuvers than the other two flight profiles.

Figure 11:
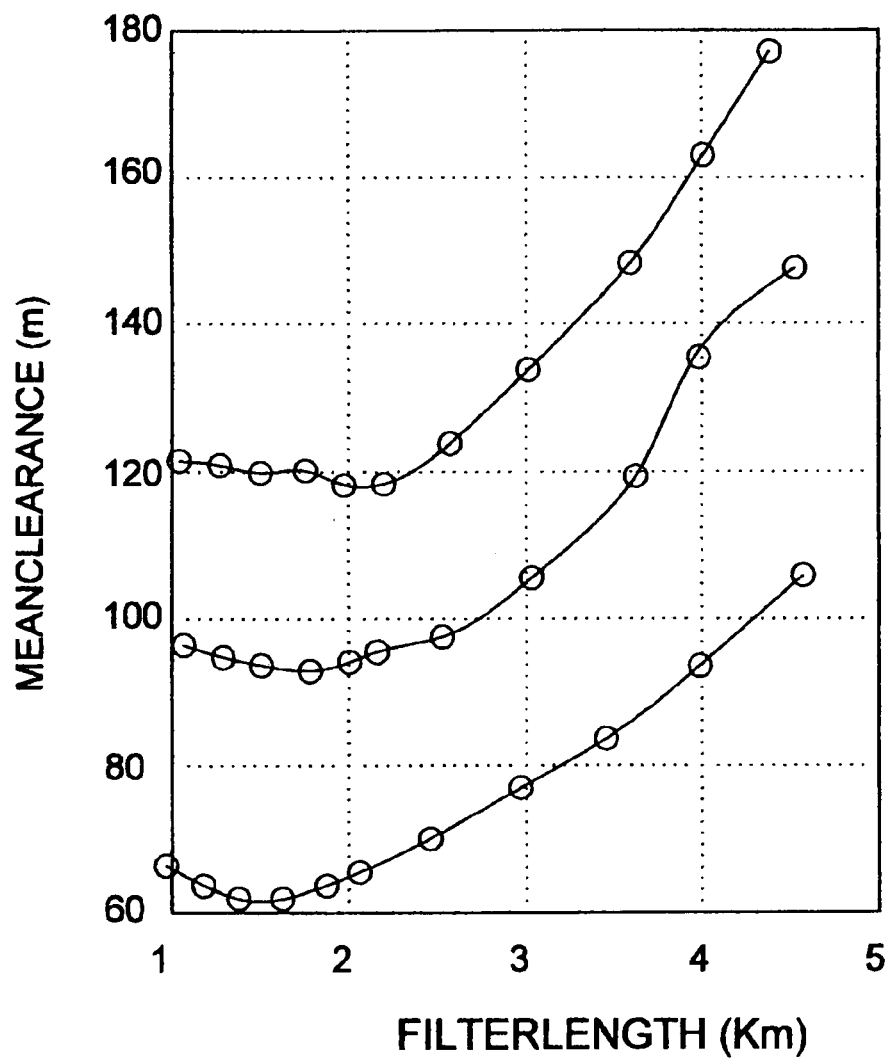
FIG. 11 shows plots of mean clearances vs. filter length for the terrain profile of FIGS. 10A-10C.

FIG. 11 shows three plots 130, 132 and 134 of the mean clearance of flight profiles above the inflated terrain profile as a function of the length of the filters that were used to filter the inflated terrain profile prior to computing the various flight profiles. Plot 130 refers to the entire 110 Km terrain profile. Plot 132 refers to the first 40 Km of the terrain profile, as shown in FIG. 10A. Plot 134 refers to the last 30 Km of the terrain profile, as shown in FIG. 10C. A 1 Km filter gives the closest terrain following for the terrain profile as a whole and also for the last 30 Km of the terrain profile. A 0.6 Km filter gives the closest terrain following for the first 40 Km of the terrain profile.

In general, the length of the filter that gives the closest terrain following depends on the nature of the terrain. It also should be remembered that terrain following is achieved at the expense of the increased fuel consumption needed to follow the terrain. Preferably, the terrain profile filter length is selected in advance of the mission assigned to the air vehicle, in accordance with these two criteria. The nature of the mission determines the relative importance of the two criteria (closeness of terrain following vs. gentleness of maneuver) that are used to select the terrain profile filter length.

Figure 12:
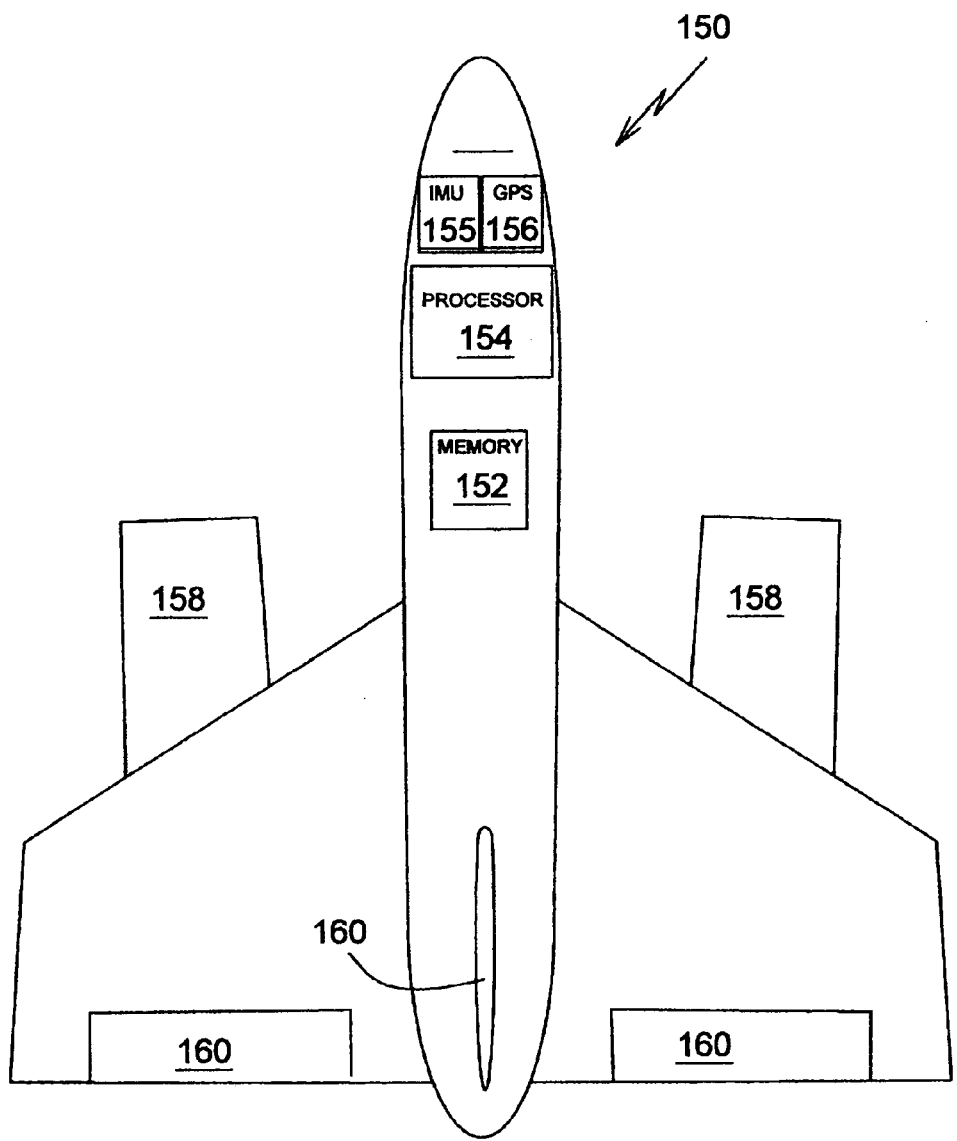
FIG. 12 is a schematic diagram of an air vehicle of the present invention.

FIG. 12 is a schematic diagram of an air vehicle 150 of the present invention. On board air vehicle 150 are a memory 152 for storing a digital terrain map and (optionally, for an unmanned air vehicle 150) a flight path within the digital terrain map, two navigational instruments (a self-contained navigational instrument 155 such as an inertial measurement unit, and a second navigational instrument 156, such as a GPS receiver, that relies on external signals) for determining the position and velocity of the air vehicle in real time, and a processor 154 for implementing the method of the present invention to compute a reference flight profile for air vehicle 150 in real time, in accordance with the digital terrain map stored in memory 152, optionally in accordance with the flight path stored in memory 152, in accordance with the position of air vehicle 150 as measured by navigational instruments 155 and 156, and in accordance with the time-varying performance parameters of air vehicle 150. Air vehicle 150 also includes a propulsion and guidance system, represented in FIG. 12 by jet engines 158 and control surfaces 160, for flying air vehicle 150 along the flight path in accordance with the computed reference flight profile.

While the invention has been described with respect to a limited number of embodiments, it will be appreciated that many variations, modifications and other applications of the invention may be made.

What is claimed is:

1. A method of designing a terrain-following flight profile for an air vehicle, comprising the steps of:
   (a) providing a terrain profile; and
   (b) transforming said terrain profile into the terrain-following flight profile in accordance with at least one performance parameter of the air vehicle;
   wherein a value of each said at least one performance parameter varies as the air vehicle flies along a flight path corresponding to the flight profile.

2. The method of claim 1, wherein said providing of said terrain profile includes defining said terrain profile with reference to a flight corridor.

3. The method of claim 2, wherein said flight corridor is a flight path.

4. The method of claim 1, wherein said transforming is effected in a manner that directly adapts said terrain profile to said at least one performance parameter.

5. A method of designing a terrain-following flight profile for an air vehicle, comprising the steps of:
   (a) defining a terrain profile with reference to a flight corridor;
   (b) inflating said terrain profile, thereby providing an inflated terrain profile;
   (c) filtering said inflated terrain profile, thereby providing a filtered terrain profile;
   (d) constructing a first envelope for said filtered terrain profile, said first envelope being constrained so that every positive slope of said first envelope is at most about as great as a maximum climb slope of the air vehicle and every negative slope of said first envelope is at most about as small as a minimum dive slope of the air vehicle;
   (e) constructing a second envelope for said first envelope, said second envelope being constrained so that if the air vehicle flies at a given speed according to said second envelope, every negative vertical acceleration of the air vehicle is at most about as small as a minimum negative vertical acceleration of the air vehicle; and
   (f) constructing a third envelope for said second envelope, said third envelope being constrained so that if the air vehicle flies at said given speed according to said third envelope, every positive vertical acceleration of the air vehicle is at most about as great as a maximum positive vertical acceleration of the air vehicle.

6. The method of claim 5, wherein said flight corridor is a flight path.

7. A method of designing a terrain-following flight profile for an air vehicle, comprising the steps of:
   (a) providing a terrain profile;
   (b) defining a plurality of frames that span said terrain profile, each said frame spanning only a respective portion of said terrain profile; and
   (c) for each said frame: transforming said respective portion of said terrain profile into a corresponding portion of the terrain-following flight profile in accordance with at least one performance parameter of the air vehicle.

8. The method of claim 7, wherein said transforming is effected in a manner that directly adapts said respective portion of said terrain profile to said at least one performance parameter.

9. The method of claim 7, wherein said providing of said terrain profile includes defining said terrain profile with reference to a flight corridor.

10. The method of claim 9, wherein said flight corridor is a flight path.

11. A method of designing a terrain-following flight profile for an air vehicle, comprising the steps of:
   (a) providing a terrain profile; and
   (b) filtering said terrain profile by steps including:
      (i) selecting a filter length, and
      (ii) constructing an envelope of said terrain profile in accordance with said filter length, the terrain-following flight profile then being based on said envelope.

12. The method of claim 11, wherein said filtering is effected while the air vehicle flies along a flight path corresponding to at least a portion of said terrain profile.

13. The method of claim 11, wherein said envelope is piecewise linear.

14. The method of claim 13, wherein said constructing is effected by steps including:
(A) selecting a plurality of points of said terrain profile; and
(B) connecting neighboring pairs of said points of said terrain profile with line segments.

15. The method of claim 14, wherein a first said selected point is a first point of said terrain profile, and wherein said selecting of a remainder of said selected points is effected by steps including:
(1) designating said first selected point as a pivot point;
(2) downwardly pivoting a filtering line segment, that has a horizontal extent equal to said filter length, about said pivot point, until said filtering line segment contacts said terrain profile;
(3) moving said pivot point to a last point at which said filtering line segment contacts said terrain profile, thereby selecting said last point as a next of said selected points; and
(4) effecting steps (2) and (3) until said last point at which said filtering line segment contacts said terrain profile is a last point of said terrain profile.

16. The method of claim 11, wherein said providing of said terrain profile includes defining said terrain profile with reference to a flight corridor.

17. The method of claim 16, wherein said flight corridor is a flight path.

18. A method of navigating an air vehicle within a flight corridor, comprising the steps of:
(a) partitioning the flight corridor among a set of at least one frame; and
(b) when the air vehicle enters each of said at least one frame:
(i) defining a respective terrain profile with respect to a respective portion of the flight corridor that lies within said each frame, and
(ii) transforming said respective terrain profile into a respective flight profile for said each frame in accordance with at least one performance parameter of the air vehicle.

19. The method of claim 18, further comprising the step of:
(c) in each said at least one frame, flying the air vehicle within at least a portion of said respective portion of the flight corridor in accordance with said respective flight profile.

20. The method of claim 18, wherein each said flight profile is a terrain-following flight profile.

21. The method of claim 18, wherein said flight corridor is a flight path.

22. An air vehicle comprising:
(a) a memory for storing a map;
(b) a processor for:
(i) partitioning a flight corridor among a set of at least one frame, and
(ii) as the air vehicle enters each of said at least one frame:
(A) based on said map, providing a respective terrain profile for a respective portion of said flight corridor that lies within said each frame, and
(B) transforming said respective terrain profile into a respective terrain-following flight profile for said each frame in accordance with at least one performance parameter of the air vehicle; and
(c) a propulsion and guidance system for flying the air vehicle within said flight corridor in accordance with said at least one respective flight profile.

23. The air vehicle of claim 22, wherein said flight corridor is partitioned among a plurality of said frames, and wherein said propulsion and guidance system flies the air vehicle in accordance with a concatenation of at least portions of said flight profiles.

24. The air vehicle of claim 22, wherein said map is a digital terrain map.

25. The air vehicle of claim 22, wherein each said flight profile is a terrain-following flight profile.

26. The air vehicle of claim 22, wherein said flight corridor is a flight path.

27. A method of designing a terrain-following flight path for an air vehicle, comprising the steps of:
(a) providing a terrain profile; and
(b) transforming said terrain profile into the terrain-following flight path in accordance with a desired tradeoff between a closeness with which the terrain-following flight path tracks said terrain profile and an ease of maneuver of the air vehicle;
wherein said ease of maneuver varies as the air vehicle flies along a trajectory corresponding to the flight path.

28. A method of designing a terrain-following flight profile for an air vehicle, comprising the steps of:
(a) providing a terrain profile; and
(b) transforming said terrain profile into the terrain-following flight profile in accordance with a maximum climb slope of the air vehicle and a minimum dive slope of the air vehicle, said transforming including the step of:
(i) constructing a first envelope for said terrain profile, said first envelope being constrained so that every positive slope of said first envelope is at most about as great as said maximum climb slope of the air vehicle and every negative slope of said first envelope is at most about as small as said minimum dive slope of the air vehicle.

29. The method of claim 28, wherein said constructing of said first envelope is effected non-iteratively.

30. The method of claim 28, wherein said constructing of said first envelope is effected while the air vehicle flies along a flight path corresponding to at least a portion of said terrain profile.

31. The method of claim 28, wherein said at least one performance parameter further includes a minimum negative vertical acceleration of the air vehicle as the air vehicle flies at a given speed, and wherein said transforming further includes the step of:
(ii) constructing a second envelope for said first envelope, said second envelope being constrained so that if the air vehicle flies at said given speed according to said second envelope, every negative vertical acceleration of the air vehicle is at most about as small as said minimum negative vertical acceleration of the air vehicle.

32. The method of claim 31, wherein said second envelope is further constrained so that every positive slope of said second envelope is at most about as great as said maximum climb slope of the air vehicle and every negative slope of said second envelope is at most about as small as said minimum dive slope of the air vehicle.

33. The method of claim 31, wherein said constructing of said second envelope is effected non-iteratively.

34. The method of claim 31, wherein said constructing of said first and second envelopes is effected while the air vehicle flies along a flight path corresponding to at least a portion of said terrain profile.

35. The method of claim 31, wherein said at least one performance parameter further includes a maximum positive vertical acceleration of the air vehicle as the air vehicle files at said given speed, and wherein said transforming further includes the step of:
  (iii) constructing a third envelope for said second envelope, said third envelope being constrained so that if the air vehicle flies at said given speed according to said third envelope, every positive vertical acceleration of the air vehicle is at most about as great as said maximum positive vertical acceleration of the air vehicle.

36. The method of claim 35, wherein said third envelope is further constrained so that every positive slope of said third envelope is at most about as great as said maximum climb slope of the air vehicle and every negative slope of said third envelope is at most about as small as said minimum dive slope of the air vehicle.

37. The method of claim 35, wherein said constructing of said third envelope is effected non-iteratively.

38. The method of claim 35, wherein said third envelope is the terrain-following flight profile.

39. The method of claim 35, wherein said constructing of said first, second and third envelopes is effected while the air vehicle flies along a flight path corresponding to at least a portion of said terrain profile.

40. A method of designing a terrain-following flight profile for an air vehicle, comprising the steps of:
  (a) providing an inflated terrain profile; and
  (b) transforming said inflated terrain profile into the terrain-following flight profile in accordance with at least one performance parameter of the air vehicle.

41. A method of designing a terrain-following flight profile for an air vehicle, comprising the steps of:
  (a) providing a terrain profile; and
  (b) transforming said terrain profile into the terrain-following flight profile in accordance with at least one performance parameter of the air vehicle;
wherein at least a portion of said providing of said terrain profile is effected while the air vehicle flies along a flight path corresponding to at least a portion of said terrain profile.

42. The method of claim 41, wherein said transforming of said at least portion of said terrain profile is effected while the air vehicle flies along said flight path.

43. A method of designing a terrain-following flight profile for an air vehicle, comprising the steps of:
  (a) providing a terrain profile;
  (b) transforming said terrain profile into the terrain-following flight profile in accordance with at least one performance parameter of the air vehicle; and
  (c) filtering said terrain profile, prior to said transforming.

44. A method of designing a terrain-following flight profile for an air vehicle, comprising the steps of: for each of a plurality of frames:
  (a) providing a respective terrain profile; and
  (b) transforming said respective terrain profile into at least a portion of the terrain-following flight profile in accordance with:
    (i) a maximum climb slope of the air vehicle,
    (ii) a minimum dive slope of the air vehicle,
    (iii) a minimum negative vertical acceleration of the air vehicle as the air vehicle flies at a given speed, and
    (iv) a maximum positive vertical acceleration of the air vehicle as the air vehicle flies at said given speed;
and wherein said transforming is effected by steps including constructing a respective envelope, for said terrain profile, that is constrained so that:
    (i) every positive slope of said envelope is at most about as great as said maximum climb slope of the air vehicle;
    (ii) every negative slope of said envelope is at most about as small as said minimum dive slope of the air vehicle;
    (iii) every negative vertical acceleration of the air vehicle is at most about as small as said minimum negative vertical acceleration of the air vehicle; and
    (iv) every positive vertical acceleration of the air vehicle is at most about as great as said maximum positive vertical acceleration of the air vehicle;
the terrain-following flight profile then being a concatenation of at least portions of said envelopes.

45. The method of claim 44, wherein, for each said frame other than a last said frame, said at least portion of each said respective envelope is an initial portion of said each respective envelope.

46. The method of claim 44, wherein, for each said frame, said constructing is effected non-iteratively.

47. The method of claim 44, wherein, for each said frame, said constructing is effected while the air vehicle flies along a flight path corresponding to at least a portion of said respective terrain profile.

48. A method of designing a terrain-following flight profile for an air vehicle, comprising the steps of: for each of a plurality of frames:
  (a) providing a respective terrain profile; and
  (b) transforming said respective terrain profile into at least a portion of the terrain-following flight profile in accordance with at least one performance parameter of the air vehicle;
wherein, for each said frame, said providing of said respective terrain profile includes the steps of:
  (i) providing a nominal flight path for said each frame;
  (ii) providing a digital terrain map that includes a plurality of elevations; and
  (iii) at each of a plurality of points along said nominal flight path, determining a maximum said elevation within an uncertainty interval around said each point.

49. A method of designing a terrain-following flight profile for an air vehicle, comprising the steps of: for each of a plurality of frames:
  (a) providing a respective terrain profile;
  (b) transforming said respective terrain profile into at least a portion of the terrain-following flight profile in accordance with at least one performance parameter of the air vehicle; and
  (c) filtering said respective terrain profile, prior to said transforming.

50. A method of navigating an air vehicle within a flight corridor, comprising the steps of:
  (a) partitioning the flight corridor among a set of at least one frame; and
  (b) as the air vehicle enters each of said at least one frame:
    (i) defining a respective terrain profile with respect to a respective portion of the flight corridor that lies within said each frame, and
    (ii) transforming said respective terrain profile into a respective flight profile for said each frame in accordance with at least one performance parameter of the air vehicle;
wherein each said respective flight profile is an envelope, of said respective terrain profile, that is constrained in accordance with said at least one performance parameter.

51. The method of claim 50, wherein said at least one performance parameter includes a maximum climb slope of the air vehicle.

52. The method of claim 50, wherein said at least one performance parameter includes a minimum dive slope of the air vehicle.

53. The method of claim 50, wherein said at least one performance parameter includes a minimum negative vertical acceleration of the air vehicle as the air vehicle flies at a given speed.

54. The method of claim 50, wherein said at least one performance parameter includes a maximum positive vertical acceleration of the air vehicle as the air vehicle flies at a given speed.

55. The method of claim 50, wherein each said envelope is constrained in a manner that directly adapts said envelope to said at least one performance parameter.

56. A method of navigating an air vehicle within a flight corridor, comprising the steps of:
   (a) partitioning the flight corridor among a set of at least one frame; and
   (b) as the air vehicle enters each of said at least one frame:
      (i) defining a respective terrain profile with respect to a respective portion of the flight corridor that lies within said each frame, and
      (ii) transforming said respective terrain profile into a respective flight profile for said each frame in accordance with at least one performance parameter of the air vehicle;
wherein, as the air vehicle enters each said at least one frame, said providing includes inflating said respective terrain profile to provide an inflated respective terrain profile, said transforming then being effected on said inflated respective terrain profile.

57. A method of navigating an air vehicle within a flight corridor, comprising the steps of:
   (a) partitioning the flight corridor among a set of at least one frame; and
   (b) as the air vehicle enters each of said at least one frame:
      (i) defining a respective terrain profile with respect to a respective portion of the flight corridor that lies within said each frame,
      (ii) filtering said respective terrain profile to provide a filtered respective terrain profile, and
      (iii) transforming said filtered respective terrain profile into a respective flight profile for said each frame in accordance with at least one performance parameter of the air vehicle 58. A method of designing a terrain-following flight path for an air vehicle, comprising the steps of:
   (a) providing a terrain profile; and
   (b) transforming said terrain profile into the terrain-following flight path in accordance with a desired tradeoff between a closeness with which the terrain-following flight path tracks said terrain profile and an ease of maneuver of the air vehicle, said transforming being effected by steps including:
      (i) selecting a filter length in accordance with said tradeoff; and
      (ii) filtering said terrain profile using a filter having said filter length.

59. The method of claim 58, wherein said filtering is effected by steps including constructing an envelope of said terrain profile in accordance with said filter length.

* * * * *

UNITED STATES PATENT AND TRADEMARK OFFICE
CERTIFICATE OF CORRECTION

PATENT NO.        : 7,321,812 B2
APPLICATION NO. : 11/035728
DATED             : January 22, 2008
INVENTOR(S)      : Gadi Silberman and Nitsan Sharav-Schapiro It is certified that error appears in the above-identified patent and that said Letters Patent is hereby corrected as shown below:

Claim 35, column 21 should be corrected as follows:

Line 3: change "files" to -- flies --

Claim 57, column 24 should be corrected as follows:

Line 14: after "of the air vehicle" add -- . --

Signed and Sealed this

Thirteenth Day of May, 2008

JON W. DUDAS
*Director of the United States Patent and Trademark Office*